(12) United States Patent
Iwata et al.

(10) Patent No.: US 10,411,620 B2
(45) Date of Patent: Sep. 10, 2019

(54) POWER TOOL

(71) Applicant: Hitachi Koki Co., Ltd., Tokyo (JP)

(72) Inventors: Kazutaka Iwata, Hitachinaka (JP); Kazuhiko Funabashi, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 45 days.

(21) Appl. No.: 15/749,045

(22) PCT Filed: Jun. 27, 2016

(86) PCT No.: PCT/JP2016/068990
§ 371 (c)(1),
(2) Date: Jan. 30, 2018

(87) PCT Pub. No.: WO2017/022362
PCT Pub. Date: Feb. 9, 2017

(65) Prior Publication Data
US 2018/0219498 A1  Aug. 2, 2018

(30) Foreign Application Priority Data
Jul. 31, 2015 (JP) .................. 2015-152833

(51) Int. Cl.
*H02P 6/10* (2006.01)
*B25F 5/02* (2006.01)
(Continued)

(52) U.S. Cl.
CPC ............. *H02P 6/10* (2013.01); *B25F 5/00* (2013.01); *B25F 5/02* (2013.01); *H02P 29/40* (2016.02);
(Continued)

(58) Field of Classification Search
USPC .............. 318/126, 754, 3, 763, 777
See application file for complete search history.

(56) References Cited

U.S. PATENT DOCUMENTS 7,554,303 B1 *  6/2009  Kawamura ............... H02P 9/14
322/46
2009/0224712 A1 *  9/2009  Izaki ..................... F24F 12/006
318/400.32
(Continued)

FOREIGN PATENT DOCUMENTS

JP    04-244771 A    9/1992
JP    2002-051589 A  2/2002
(Continued)

OTHER PUBLICATIONS

International Report on Patentability for application PCT/JP2016/068990 (dated Feb. 6, 2018), 5 pages.
(Continued)

*Primary Examiner* — Jorge L Carrasquillo
(74) *Attorney, Agent, or Firm* — Kilpatrick Townsend & Stockton LLP

(57) ABSTRACT

To provide a power tool capable of suppressing torque ripple and reducing power consumption without demagnetizing the permanent magnets in the rotor. The power tool includes a brushless motor, converting means, voltage detecting, and means conduction switching means. The brushless motor includes: a stator including a plurality of windings; and a rotor rotatable relative to the stator. The converting means is configured to convert an AC voltage supplied from an AC power supply into a varying DC voltage. The voltage detecting means is configured to detect the varying DC voltage. The conduction switching means includes an output line for applying the varying DC voltage to the plurality of windings. The conduction switching means is configured to perform: sequentially switching at least one winding to be applied with the varying DC voltage among the plurality of windings to rotate the rotor; and changing number of conducting windings on the basis of the varying DC voltage, the
(Continued)

number of conducting windings being number of the at least one winding to be applied with the varying DC voltage.

11 Claims, 22 Drawing Sheets

(51) Int. Cl.
*H02P 29/40* (2016.01)
*B25F 5/00* (2006.01)
*H02K 11/26* (2016.01)
*H02K 11/33* (2016.01)
*B23D 45/16* (2006.01)
*B23D 47/12* (2006.01)
*H02K 7/14* (2006.01)
*H02K 29/03* (2006.01)

(52) U.S. Cl.
CPC .............. *B23D 45/16* (2013.01); *B23D 47/12* (2013.01); *B25F 5/001* (2013.01); *H02K 7/145* (2013.01); *H02K 11/26* (2016.01); *H02K 11/33* (2016.01); *H02K 29/03* (2013.01); *H02P 2207/05* (2013.01)

(56) References Cited

U.S. PATENT DOCUMENTS

| | | |
|---|---|---|
| 2013/0264987 A1 | 10/2013 | Uchida et al. |
| 2014/0001993 A1 | 1/2014 | Iwata et al. |
| 2015/0047866 A1 | 2/2015 | Sakai et al. |
| 2016/0190955 A1* | 6/2016 | Hatakeyama ......... H02M 3/158 318/3 |
| 2017/0264219 A1* | 9/2017 | Takeda ..................... B25F 5/00 |

FOREIGN PATENT DOCUMENTS

| | | |
|---|---|---|
| JP | 3596711 B2 | 12/2004 |
| JP | 2012-090460 A | 5/2012 |
| JP | 2012-196725 A | 10/2012 |
| JP | 2013-143878 A | 7/2013 |

OTHER PUBLICATIONS

International Search Report for international application PCT/JP2016/068990 (dated Sep. 27, 2016) 8 pages with translation.
European Patent Office Extended Search for EP16832641.1 dated Apr. 17, 2019, 5 pages.

* cited by examiner

FIG. 7
(a)
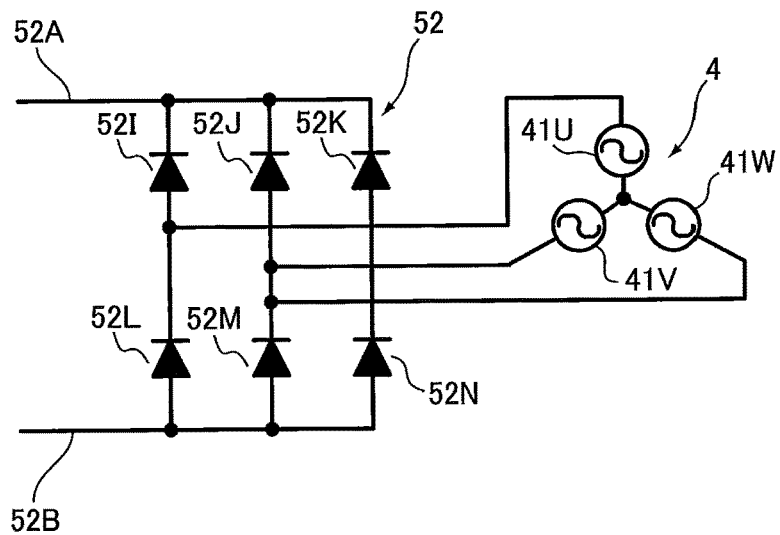
(b)
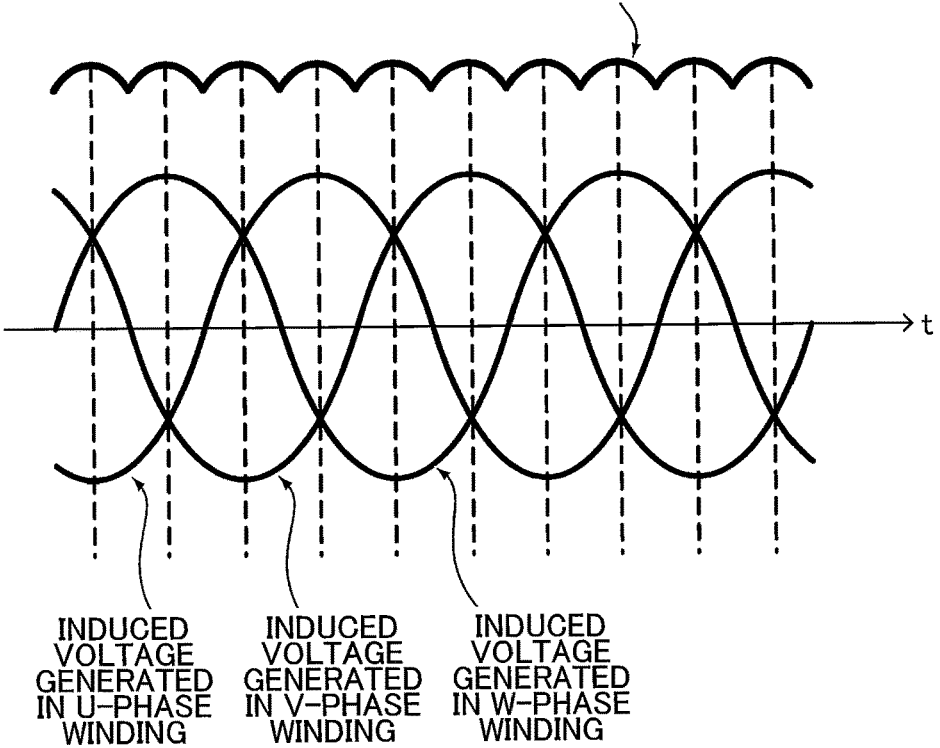

FIG. 18
(a)
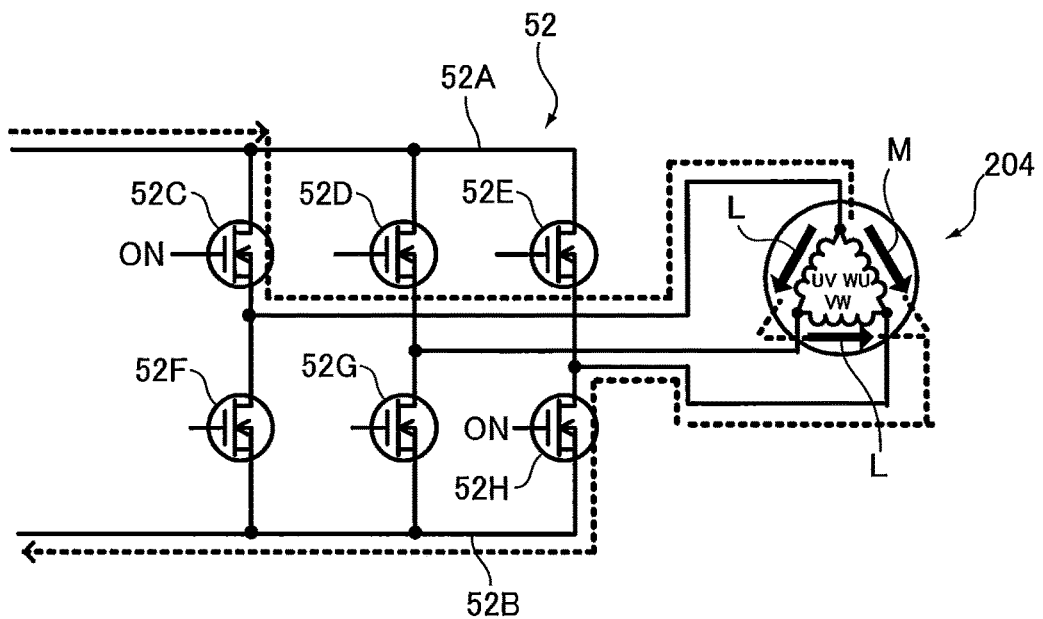
(b)
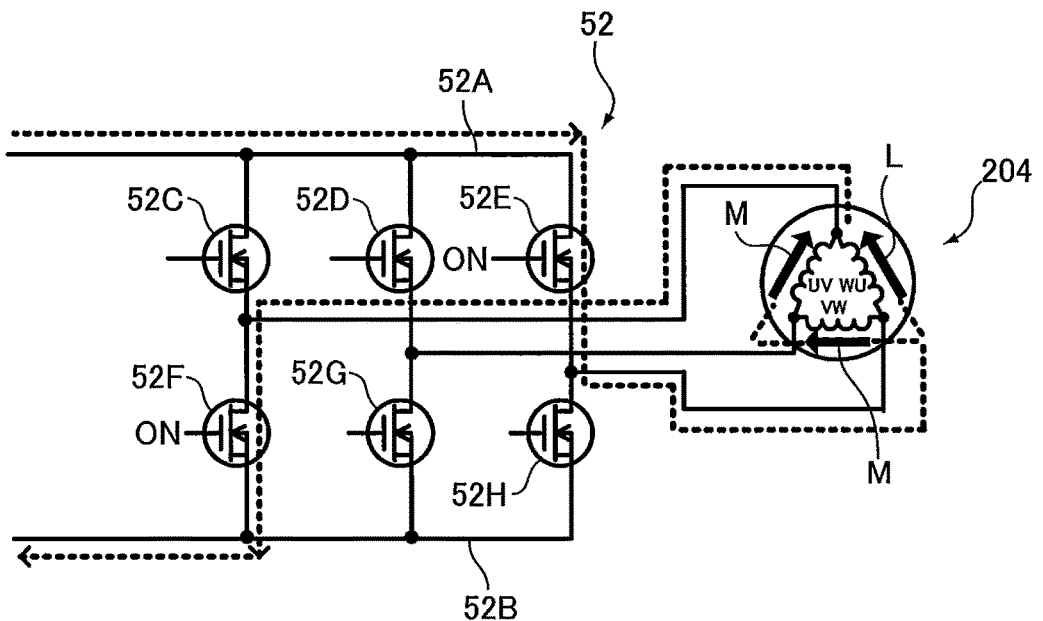

POWER TOOL

TECHNICAL FIELD

The present invention relates to a power tool equipped with a brushless motor.

BACKGROUND ART

Power tools provided with a rectifier circuit for rectifying AC voltage supplied from an AC power supply, and a large-capacitance smoothing capacitor for smoothing the voltage outputted from the rectifier circuit into a substantially constant DC voltage have been widely used. Since the smoothing capacitor in this type of power tool has a large capacitance, the periods in the cycle of the AC voltage in which the absolute value of voltage from the AC power supply is higher than the voltage across the terminals of the smoothing capacitor are short and, thus, the periods in which current flows from the AC power supply to the power tool are short. Consequently, the waveform of the current flowing into the power tool from the AC power supply is distorted and has many harmonics, lowering the power factor.

To resolve the problem described above, there is known in the art a control device for controlling the inverter that drives the motor (Patent Literature 1). The control device attempts to improve the power factor by using a small-capacitance smoothing capacitor to lengthen the period during which current flows from the AC power supply to the power tool. Since the smoothing capacitor in this control device is configured with a small capacitance, the capacitor only slightly smooths voltage that has undergone full-wave rectification in the rectifier circuit, and thus voltage having a near-full-wave rectified waveform (hereinafter called a "near-full-wave rectified voltage") is applied to the brushless motor.

The structure described above for applying voltage having a near-full-wave rectified waveform to the brushless motor may produce torque ripple because, during the variation cycle of the near-full-wave rectified voltage, electric current does not flow through the coils during periods in which the near-full-wave rectified voltage is lower than the induced voltage generated in the coils of the brushless motor. To suppress this torque ripple, the conventional control device performs field-weakening control for reducing the induced voltage. By this field-weakening control, the period in which the near-full-wave rectified voltage is lower than the induced voltage is shortened and thus the period in which electric current does not flow through the coils is also shortened, thereby suppressing torque ripple.

CITATION LIST

Patent Literature

[PTL 1]
Japanese Patent Application Publication No. 2002-051589

SUMMARY OF INVENTION

Technical Problem

However, in the field-weakening control described above, electric current is applied to a prescribed circuit in order to lower the induced voltage, generating a magnetic field in the direction opposite the magnetic field generated by the rotation of the rotor. This leads to the wasteful consumption of power not directly related to drive of the brushless motor. Further, since the magnetic field generated in the field-weakening control described above has a direction opposite the magnetic field produced by the rotation of the rotor, the permanent magnets provided in the rotor may become demagnetized.

In view of the foregoing, it is an object of the present invention to provide a power tool capable of suppressing torque ripple and reducing power consumption without demagnetizing the permanent magnets in the rotor.

Solution to Problem

In order to attain the above and other objects, the present invention provides a power tool including a brushless motor, converting means, voltage detecting, and means conduction switching means. The brushless motor includes: a stator including a plurality of windings; and a rotor rotatable relative to the stator. The converting means is configured to convert an AC voltage supplied from an AC power supply into a varying DC voltage. The voltage detecting means is configured to detect the varying DC voltage. The conduction switching means includes an output line for applying the varying DC voltage to the plurality of windings. The conduction switching means is configured to perform: sequentially switching at least one winding to be applied with the varying DC voltage among the plurality of windings to rotate the rotor; and changing number of conducting windings on the basis of the varying DC voltage, the number of conducting windings being number of the at least one winding to be applied with the varying DC voltage.

With the above configuration, the number of conducting windings can be changed. Accordingly, the combined voltage of induced voltages produced in the conducting windings can be changed. That is, the combined voltage applied to the output line can be changed. Thus, the power tool can lengthen the period during which the varying DC voltage is higher than the combined induced voltage and electric current flows through the brushless motor, i.e., the period in which torque is generated, thereby suppressing torque ripple. Further, since in the above configuration the combination of induced voltage is changed by modifying the number of conducting windings, the power tool can reduce power consumption and suppress demagnetization of the permanent magnets in the rotor better than a structure that modifies the induced voltage through field-weakening control or the like in which current is supplied for weakening the magnetic field.

In the above configuration, it is preferable that: the varying DC voltage repeats rising and falling; the conduction switching means performs decreasing, as the changing, the number of conducting windings within a period of time during which the varying DC voltage falls; and the conduction switching means performs increasing, as the changing, the number of conducting windings within a period of time during which the varying DC voltage rises.

With this configuration, a period of time during which current is supplied to the brushless motor can be lengthened, thereby suppressing torque ripple.

Further, in the above configurations, it is preferable that: when the varying DC voltage is higher than or equal to a voltage threshold value, the conduction switching means performs setting, as the changing, the number of conducting windings to a first conduction number; when the varying DC voltage is lower than the voltage threshold value, the conduction switching means performs setting, as the changing, the number of conducting windings to a second conduction number, the second conduction number being smaller than the first conduction number; and the voltage threshold value is lower than a maximum value of the varying DC voltage and is higher than a combined voltage of induced voltages generated in the first conduction number windings applied with the varying DC voltage.

In this configuration, since the number of conducting windings is set to the second conduction number when the varying DC voltage is less than the voltage threshold value, the combined voltage of induced voltages generated in the conducting windings can be made lower than that when the first conduction number conducting windings are used. Accordingly, current can be supplied to the brushless motor even when the varying DC voltage is lower than the combination of induced voltages generated in the first conduction number conducting windings, thereby lengthening the period of time during which current flows through the brushless motor. As a result, torque ripple can be suppressed. Further, since the voltage threshold value is higher than the combined voltage of induced voltages in the first conduction number conducting windings, the number of conducting windings can be reliably changed from the first conduction number to the second conduction number before the varying DC voltage falls below the combined voltage of induced voltages in the first conduction number conducting windings, thereby reliably suppressing torque ripple.

Further, in the above configurations, it is preferable that: the plurality of windings constitutes star-connected three-phase windings having a neutral point; the conduction switching means further includes a bridge circuit capable of connecting the output line to the neutral point; and the setting the number of conducting windings to the second conduction number is performed by applying the varying DC voltage to the star-connected three-phase windings via the bridge circuit.

In this configuration, through a simple construction that voltage is applied to the three-phase windings via the bridge circuit, the number of conducting windings can be switched between the first conducting number and the second conducting number.

Further, in the above configurations, it is preferable that: the plurality of windings constitutes delta-connected three-phase windings; the setting the number of conducting windings to the first conduction number is performed by using a 180° conduction method; and the setting the number of conducting windings to the second conduction number is performed by using a 120° conduction method.

In this configuration, the number of conducting windings can be changed between the first conducting number and the second conducting number simply by switching the conduction method. Accordingly, there is no need for circuits or the like for changing these numbers, thereby simplifying the circuit structure and reducing manufacturing costs.

According to another aspect of the present invention, there is provided a power tool including a brushless motor, converting means, voltage detecting means, and conduction switching means. The brushless motor includes: a stator including a plurality of windings; and a rotor rotatable relative to the stator. The converting means is configured to convert an AC voltage supplied from an AC power supply into a varying DC voltage. The voltage detecting means is configured to detect the varying DC voltage. The conduction switching means includes a positive line and a negative line for applying the varying DC voltage to the plurality of windings. The conduction switching means is configured to perform: sequentially switching at least one winding to be connected between the positive line and the negative line and to be applied with the varying DC voltage among the plurality of windings to rotate the rotor; and changing a maximum series number on the basis of the varying DC voltage, the maximum series number being a maximum number of the at least one winding to be connected in series between the positive line and the negative line.

With the above configuration, the maximum series number of the at least one conducting winding to be connected in series between the positive line and the negative line can be changed. Accordingly, the combined voltage of induced voltages produced in the conducting windings can be changed. That is, the combined voltage applied across the positive line and the negative line can be changed. Thus, the power tool can lengthen the period during which the varying DC voltage is higher than the combined induced voltage and electric current flows through the brushless motor, i.e., the period in which torque is generated, thereby suppressing torque ripple. Further, since in the above configuration the combination of induced voltage is changed by modifying the maximum series number, the power tool can reduce power consumption and suppress demagnetization of the permanent magnets in the rotor better than a structure that changes the induced voltage through the field-weakening control or the like in which current is supplied for weakening the magnetic field.

In the above configuration, it is preferable that: the varying DC voltage repeats rising and falling; the conduction switching means performs decreasing, as the changing, the maximum series number within a period of time during which the varying DC voltage falls; and the conduction switching means performs increasing, as the changing, the maximum series number within a period of time during which the varying DC voltage rises.

With this configuration, a period of time during which current flows through the brushless motor can be lengthened, thereby suppressing torque ripple.

Further, in the above configurations, it is preferable that: when the varying DC voltage is higher than or equal to a voltage threshold value, the conduction switching means performs setting, as the changing, the maximum series number to a first series number; when the varying DC voltage is lower than the voltage threshold value, the conduction switching means performs setting, as the changing, the maximum series number to a second series number, the second series number being smaller than the first series number; and the voltage threshold value is lower than a maximum value of the varying DC voltage and is higher than a combined voltage of induced voltages generated in the first series number windings connected in series between the positive line and the negative line.

In this configuration, since the maximum series number is set to the second series number when the varying DC voltage is less than the voltage threshold value, the combined voltage of induced voltages generated in the conducting windings can be made lower than that when the maximum series number is the first series number. Accordingly, current can be supplied to the brushless motor even when the varying DC voltage is lower than the combined voltage of induced voltages generated in conducting windings when the maximum series number is the first series number, thereby lengthening the period of time during which current flows through the brushless motor. As a result, torque ripple can be suppressed. Further, since the voltage threshold value is higher than the combined voltage of induced voltages generated in conducting windings when the maximum series number is the first series number, the maximum series number can be reliably changed from the first series number to the second series number before the varying DC voltage falls below the combined voltage when the maximum series number is the first series number, thereby reliably suppressing torque ripple.

Further, in the above configurations, it is preferable that: the plurality of windings constitutes star-connected three-phase windings having a neutral point; the conduction switching means further comprises a bridge circuit capable of connecting the neutral point selectively to one of the positive line and the negative line; and the setting the maximum series number to the second series number is performed by applying the varying DC voltage to the star-connected three-phase windings via the bridge circuit.

In the above configuration, through a simple construction that voltage is applied to the three-phase windings via the bridge circuit, the maximum series number can be switched between the first series number and the second series number.

Further, in the above configurations, it is preferable that: the plurality of windings constitutes delta-connected three-phase windings; the setting the maximum series number to the first series number is performed by using a 180° conduction method; and the setting the maximum series number to the second series number is performed by using a 120° conduction method.

In this configuration, the maximum series number can be changed between the first series number and the second series number simply by switching the conduction method. Accordingly, there is no need for circuits or the like for changing these numbers, thereby simplifying the circuit structure and reducing manufacturing costs.

Further, in the above configurations, it is preferable that the power tool further includes: rotational speed detecting means configured to detect rotational speed of the rotor; and induced voltage calculating means configured to calculate, on the basis of the rotational speed of the rotor, induced voltages generated in the plurality of windings by rotation of the rotor.

According to the above configuration, the power tool can calculate induced voltage even when the power tool is not provided with a circuit for directly detecting the induced voltage itself.

According to still another aspect of the present invention, there is provided a power tool including a brushless motor, converting means, and voltage detecting means. The brushless motor includes: a stator including a plurality of windings; and a rotor rotatable relative to the stator. The converting means is configured to convert an AC voltage supplied from an AC power supply into a varying DC voltage. The voltage detecting means is configured to detect the varying DC voltage. In the power tool, at least one winding of the plurality of windings is supplied with current, and the number of the at least one winding supplied with current is changed in synchronization with the varying DC voltage.

In the above configuration, it is preferable that: the varying DC voltage repeats rising and falling; the number of the at least one winding supplied with current is decreased within a period of time during which the varying DC voltage falls; and the number of the at least one winding supplied with current is increased within a period of time during which the varying DC voltage rises.

In the above configurations, it is preferable that when the varying DC voltage becomes lower than a voltage threshold value, the number of the at least one winding supplied with current is decreased.

According to the above configurations, the number of the at least one winding supplied with current, i.e., the number of conducting windings can be changed. Thus, the power tool can lengthen the period during which the varying DC voltage is higher than the combined induced voltage and electric current flows through the brushless motor, i.e., the period in which torque is generated, thereby suppressing torque ripple. Further, the power tool can reduce power consumption and suppress demagnetization of the permanent magnets in the rotor better than a structure that modifies the induced voltage through the field-weakening control or the like in which current is supplied for weakening the magnetic field.

According to still another aspect of the present invention, there is provided a power tool including a brushless motor, converting means, voltage detecting means. The brushless motor includes: a stator including a plurality of windings; and a rotor rotatable relative to the stator. The converting means is configured to convert an AC voltage supplied from an AC power supply into a varying DC voltage. The voltage detecting means is configured to detect the varying DC voltage. In the power tool, at least one winding of the plurality of windings is supplied with current, and inductance of the at least one winding supplied with current is changed on the basis of the varying DC voltage.

In the above configuration, it is preferable that: the varying DC voltage repeats rising and falling; the inductance of the at least one winding supplied with current is decreased within a period of time during which the varying DC voltage falls; and the inductance of the at least one winding supplied with current is increased within a period of time during which the varying DC voltage rises.

In the above configurations, it is preferable that: within the period of time during which the varying DC voltage falls, number of the at least one winding supplied with current is decreased so that the inductance of the at least one winding supplied with current can be decreased; and within the period of time during which the varying DC voltage rises, the number of the at least one winding supplied with current is increased so that the inductance of the at least one winding supplied with current can be increased.

In the above configurations, it is preferable that when the varying DC voltage becomes lower than a voltage threshold value, number of the at least one winding supplied with current is changed so that the inductance of the at least one winding supplied with current can be decreased.

According to the above configurations, the inductance of the at least one winding supplied with current can be changed. Thus, the power tool can lengthen the period during which the varying DC voltage is higher than the combined induced voltage and electric current flows through the brushless motor, i.e., the period in which torque is generated, thereby suppressing torque ripple. Further, the power tool can reduce power consumption and suppress demagnetization of the permanent magnets in the rotor better than a structure that modifies the induced voltage through the field-weakening control or the like in which current is supplied for weakening the magnetic field.

Advantageous Effects of Invention

The power tool according to the present invention can suppress torque ripple and reduce power consumption without demagnetizing the permanent magnets in the rotor.

BRIEF DESCRIPTION OF DRAWINGS

FIG. 7 is a diagram describing induced voltage appearing in a first positive line of the electric circular saw according to the first embodiment of the present invention. FIG. 7(a) illustrates electrical structures of the motor and an inverter circuit when the induced voltage generated in each of the three-phase windings is treated as a power supply. FIG. 7(b) illustrates the induced voltage generated in each of the three-phase windings and induced voltage appearing in the first positive line.

FIG. 8(a) illustrates a state where the rotated position of the rotor is 0°, FIG. 8(b) illustrates a state of 30°, FIG. 8(c) illustrates a state of 60°, FIG. 8(d) illustrates a state of 90°, FIG. 8(e) illustrates a state of 120°, and FIG. 8(f) illustrates a state of 150°.

FIG. 9(a) illustrates a state where the rotated position of the rotor is 0°, FIG. 9(b) illustrates a state of 30°, FIG. 9(c) illustrates a state of 60°, FIG. 9(d) illustrates a state of 90°, FIG. 9(e) illustrates a state of 120°, and FIG. 9(f) illustrates a state of 150°.

FIG. 11(a) illustrates a state where the rotated position of the rotor is 0°, FIG. 11(b) illustrates a state of 30°, FIG. 11(c) illustrates a state of 60°, FIG. 11(d) illustrates a state of 90°, FIG. 11(e) illustrates a state of 120°, and FIG. 11(f) illustrates a state of 150°.

FIG. 12(a) illustrates a case where the rotated position is between 0°-30° and FIG. 12(b) illustrates a case of 90°-120°.

FIG. 17(a) illustrates a state where the rotated position of the rotor is 0°, FIG. 17(b) illustrates a state of 30°, FIG. 17(c) illustrates a state of 60°, FIG. 17(d) illustrates a state of 90°, FIG. 17(e) illustrates a state of 120°, and FIG. 17(f) illustrates a state of 150°.

FIG. 18 is a diagram illustrating a conducting direction in which current flows through the conducting windings during the third conduction control performed by the electric circular saw according to the second embodiment of the present invention. FIG. 18(a) illustrates a case where the rotated position is between 15°-45°. FIG. 18(b) illustrates a case of 105°-135°.

FIG. 19(a) illustrates a case of performing the third conduction control. FIG. 19(b) illustrates a case of performing fourth conduction control.

FIG. 20(a) illustrates a state where the rotated position of the rotor is 0°, FIG. 20(b) illustrates a state of 30°, FIG. 20(c) illustrates a state of 60°, FIG. 20(d) illustrates a state of 90°, FIG. 20(e) illustrates a state of 120°, and FIG. 20(f) illustrates a state of 150°.

FIG. 21(a) illustrates a case where the rotated position is between 0°-30°. FIG. 20(b) illustrates a case of 90°-120°.

DESCRIPTION OF EMBODIMENTS

A power tool according to a first embodiment of the present invention will be described with reference to FIGS.

Figure 1:
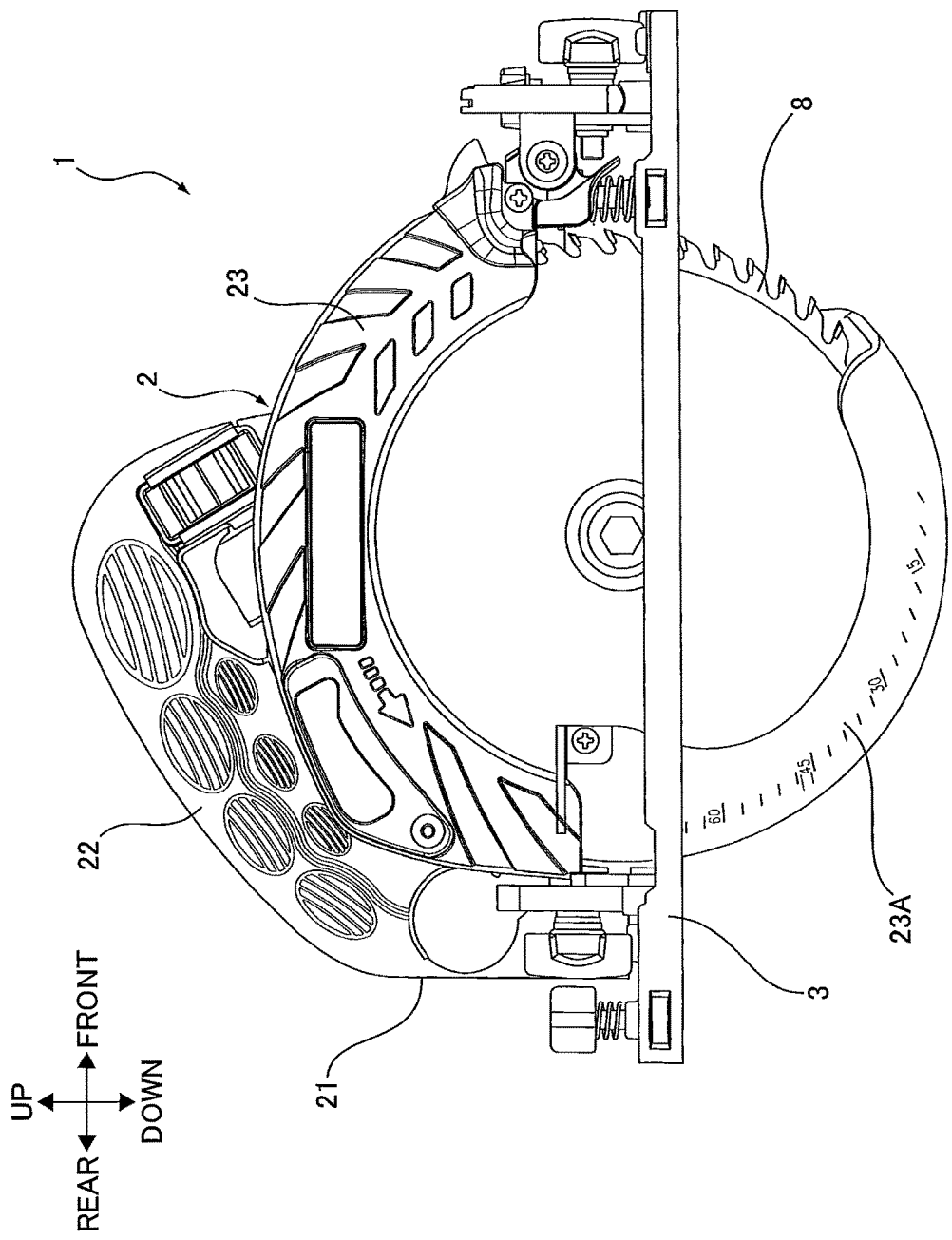
FIG. 1 is a right-side view illustrating an exterior of an electric circular saw according to a first embodiment of the present invention.

1 through 15. FIG. 1 illustrates an electric circular saw 1 as an example of the power tool according to the first embodiment. The electric circular saw 1 is provided with a housing 2 that rotatably supports a saw blade 8, and a base 3. The electric circular saw 1 is a tool that cuts a workpiece with the rotating saw blade 8 while the base 3 is slid over the workpiece. For the convenience of description, "front," "rear," "up," and "down" indicated by arrows in the drawings define the forward direction, rearward direction, upward direction, and downward direction, respectively. The rightward direction and leftward direction are respectively defined as directions toward the right and left sides of the electric circular saw 1 when viewing the electric circular saw 1 from the rear. The direction toward the near side of the drawing in FIG. 1 is the rightward direction, and the direction toward the far side of the drawing in FIG. 1 is the leftward direction.

Figure 2:
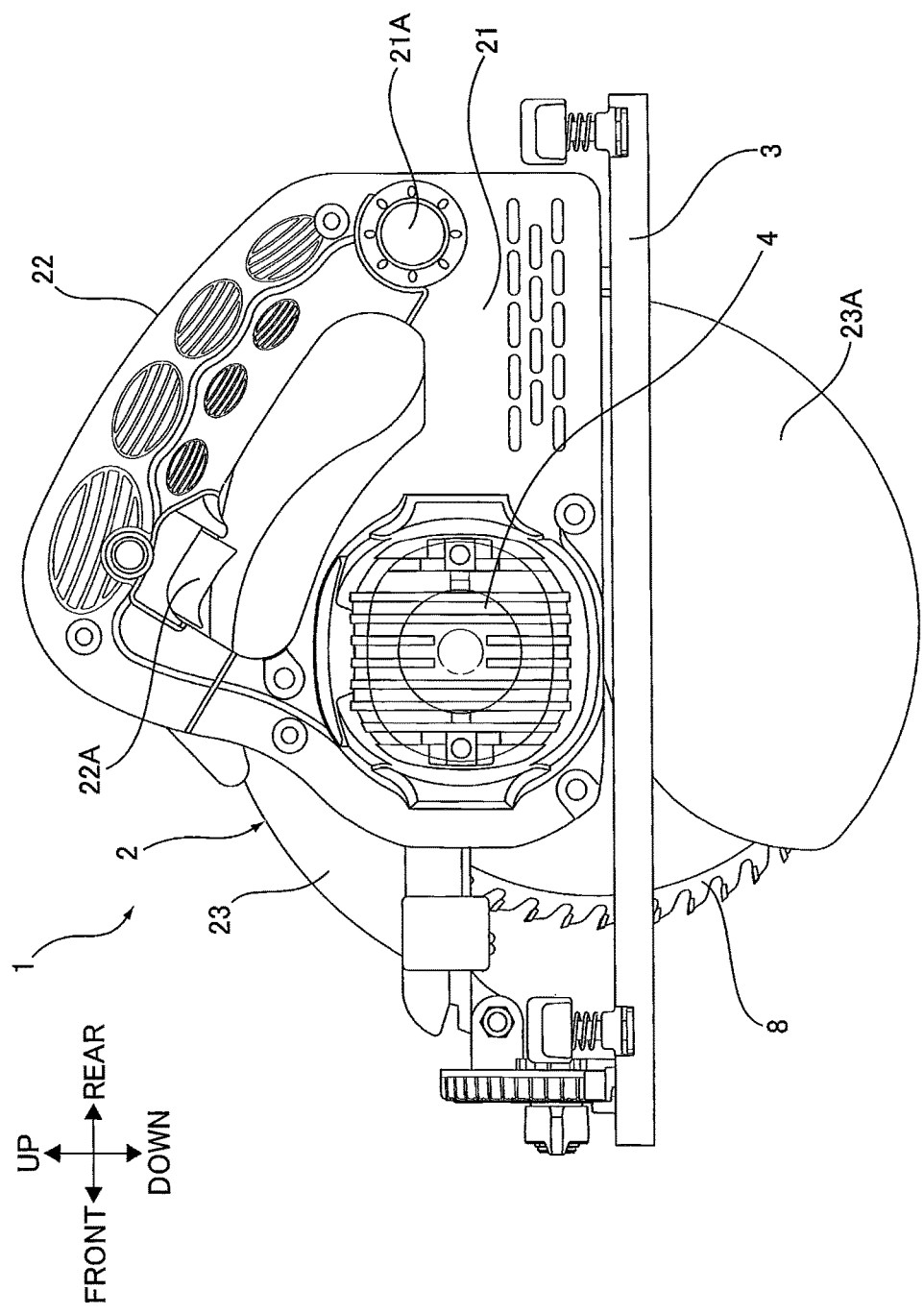
FIG. 2 is a left-side view illustrating the exterior of the electric circular saw according to the first embodiment of the present invention.
Figure 3:
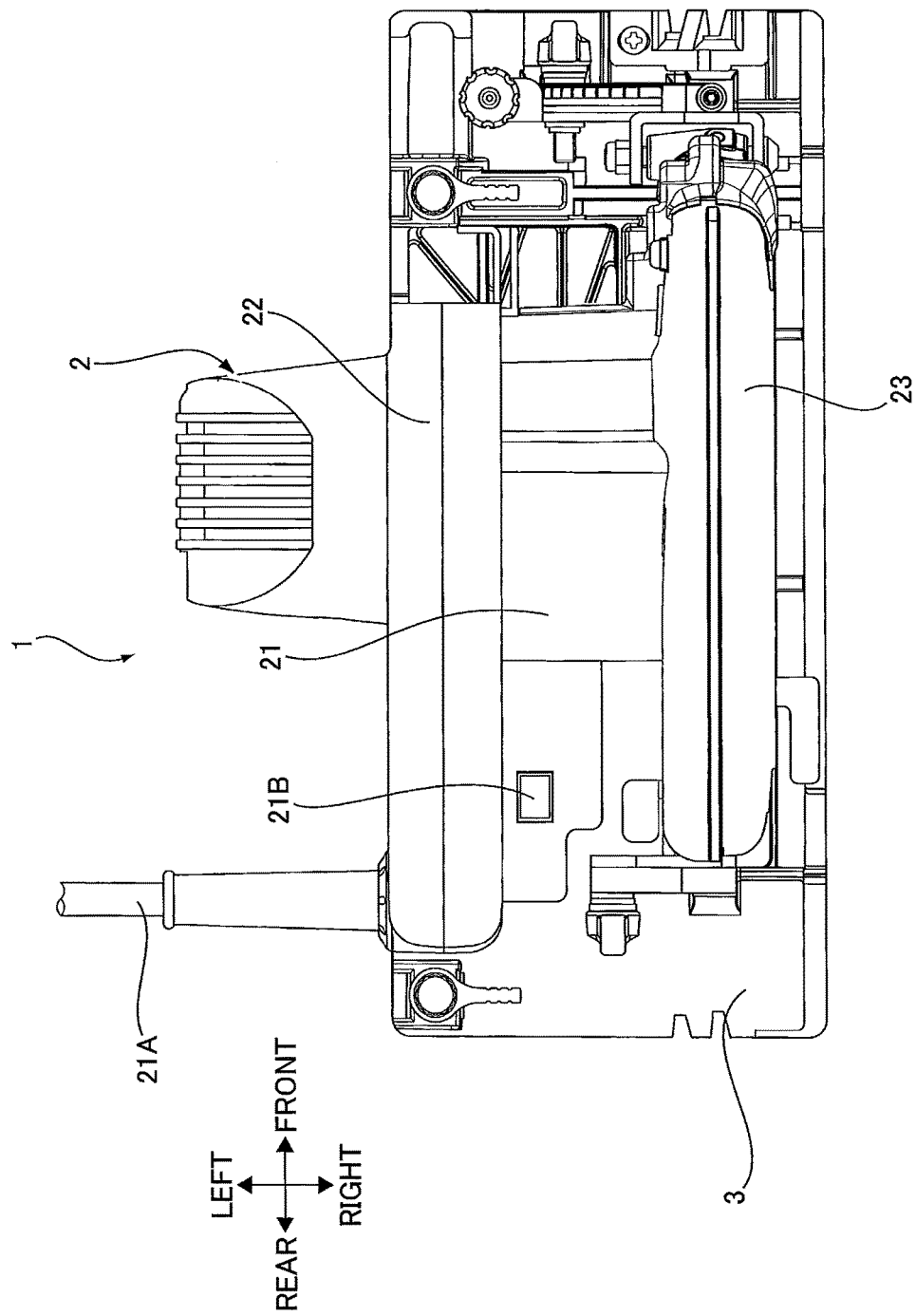
FIG. 3 is a plan view illustrating the exterior of the electric circular saw according to the first embodiment of the present invention.
Figure 4:
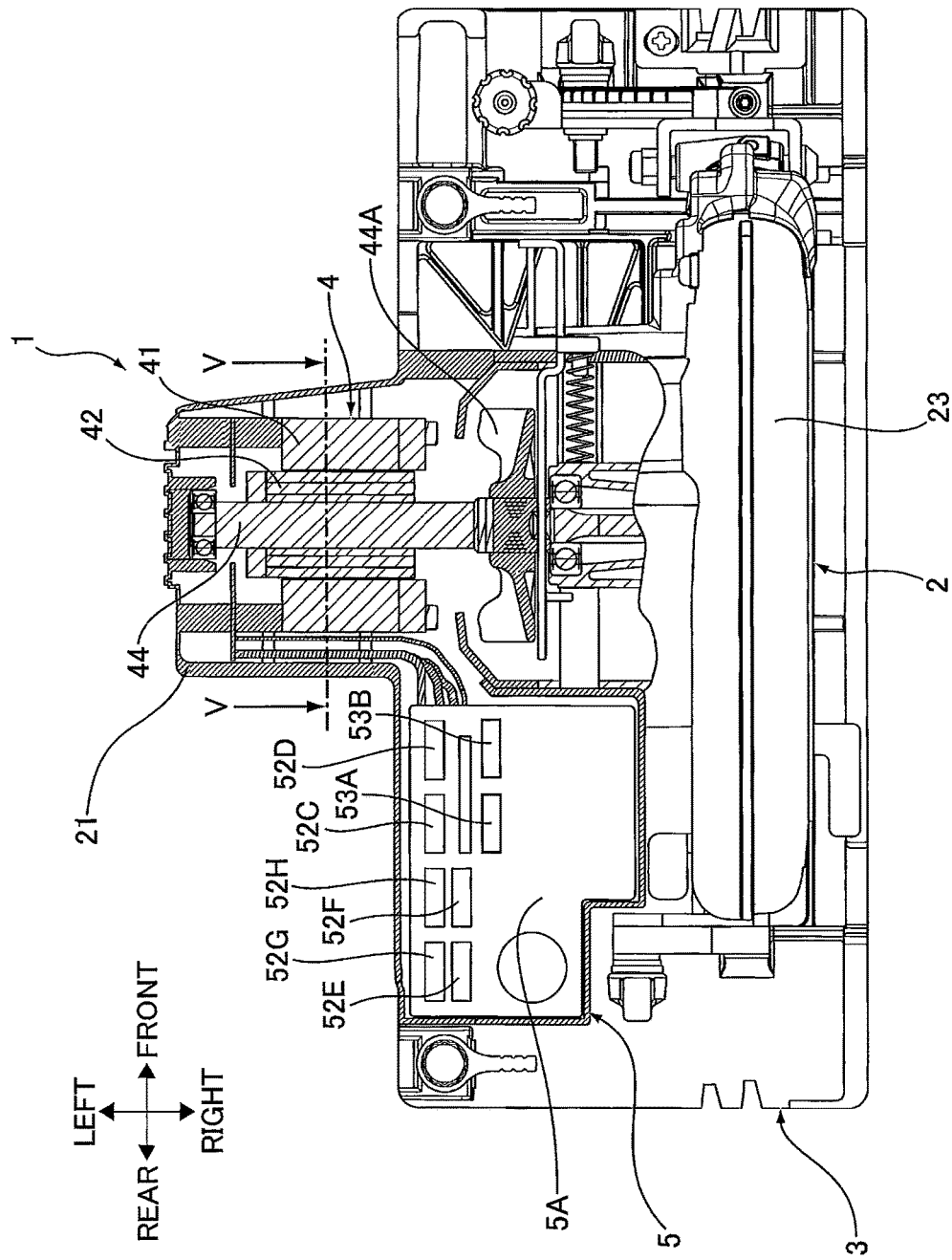
FIG. 4 is a partial cross-sectional plan view illustrating an interior of a housing of the electric circular saw according to the first embodiment of the present invention.

As illustrated in FIGS. 1 through 4, the housing 2 is provided with a housing body 21, a handle section 22, and a blade cover 23. The housing 2 is provided to be capable of tilting leftward and rightward relative to the base 3. The base 3 is a plate-shaped member formed of metal, such as aluminum. A hole (not illustrated) is formed in the base 3. The hole (not illustrated) is elongated in the front-rear direction and penetrates the base 3 vertically. The hole (not illustrated) allows the saw blade 8 to be inserted thereinto. FIG. 1 is a right-side view illustrating the exterior of the electric circular saw 1. FIG. 2 is a left-side view illustrating the exterior of the electric circular saw 1. FIG. 3 is a plan view illustrating the exterior of the electric circular saw 1. FIG. 4 is a partial cross-sectional plan view illustrating the interior of the housing 2 of the electric circular saw 1.

The housing body 21 is formed of resin, for example, and rotatably supports the saw blade 8. As illustrated in FIG. 3, the housing body 21 is provided with a power cord 21A, and a rotational speed setting switch 21B. A motor 4 and a control board unit 5 are accommodated inside the housing body 21. The motor 4 and the control board unit 5 will be described later in detail.

The power cord 21A illustrated in FIG. 3 extends leftward from the left side at the rear end of the housing body 21. The distal end of the power cord 21A is shaped to be connectable to a commercial AC power supply P. The power cord 21A is connected to the control board unit 5 inside the housing body 21. Power from the commercial AC power supply P is supplied to the motor 4 via the power cord 21A and the control board unit 5.

The rotational speed setting switch 21B is provided on the top surface of the housing body 21 for selecting a target rotational speed for the motor 4. By operating the rotational speed setting switch 21B, the user can select from among three speeds for the motor 4: high, medium, and low. The selected target speed changes in the order high, medium, and low each time the user presses the rotational speed setting switch 21B. The user can select a desired target speed by pressing the rotational speed setting switch 21B a plurality of times. The rotational speed setting switch 21B is connected to the control board unit 5 inside the housing body 21 and selectively outputs to the control board unit 5 a signal indicating the target rotational speed corresponding to the speed selected from among high, medium, and low.

As illustrated in FIGS. 1 and 2, the saw blade 8 has a disc shape. The saw blade 8 is rotatably provided on the right side of the housing body 21 and is driven to rotate by the rotation of the motor 4.

As illustrated in FIG. 2, the handle section 22 is the part that the user grips when using the electric circular saw 1. The handle section 22 extends in the front-rear direction above the housing body 21. The handle section 22 is provided with a trigger switch 22A for controlling the drive of the motor 4. The trigger switch 22A is connected to the control board unit 5 inside the housing body 21. When the user pulls the trigger switch 22A upward, a start signal for starting the motor 4 is outputted to the control board unit 5.

As illustrated in FIGS. 1 and 3, the blade cover 23 is disposed on the right side of the housing body 21. The blade cover 23 is formed of metal, for example, and has an arcuate shape in a side view. The blade cover 23 covers the approximate upper half of the saw blade 8. The blade cover 23 is provided with a protective cover 23A. The protective cover 23A is formed of resin, for example, and is provided on the rear side of the blade cover 23 so as to be revolvable along the outer edge of the saw blade 8. An urging member (not illustrated) urges the protective cover 23A along the circumference of the blade cover 23 in a direction for covering the lower half portion of the saw blade 8. When the electric circular saw 1 is not performing a cutting operation, the protective cover 23A covers the lower half portion of the saw blade 8, excluding a portion on the front side.

Figure 5:
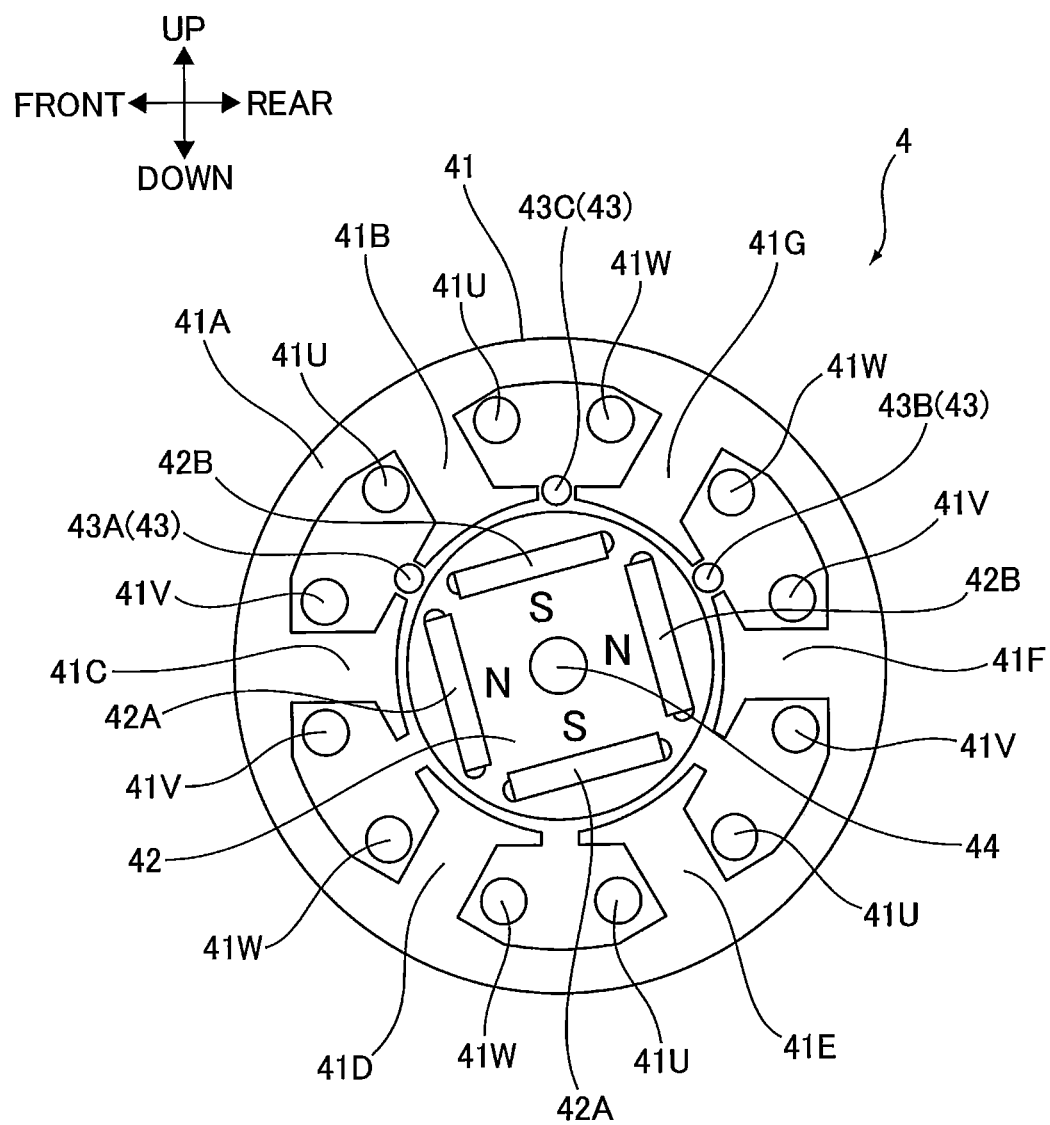
FIG. 5 is a cross-sectional view along V-V and illustrates an interior of a motor of the electric circular saw according to the first embodiment of the present invention.
Figure 6:
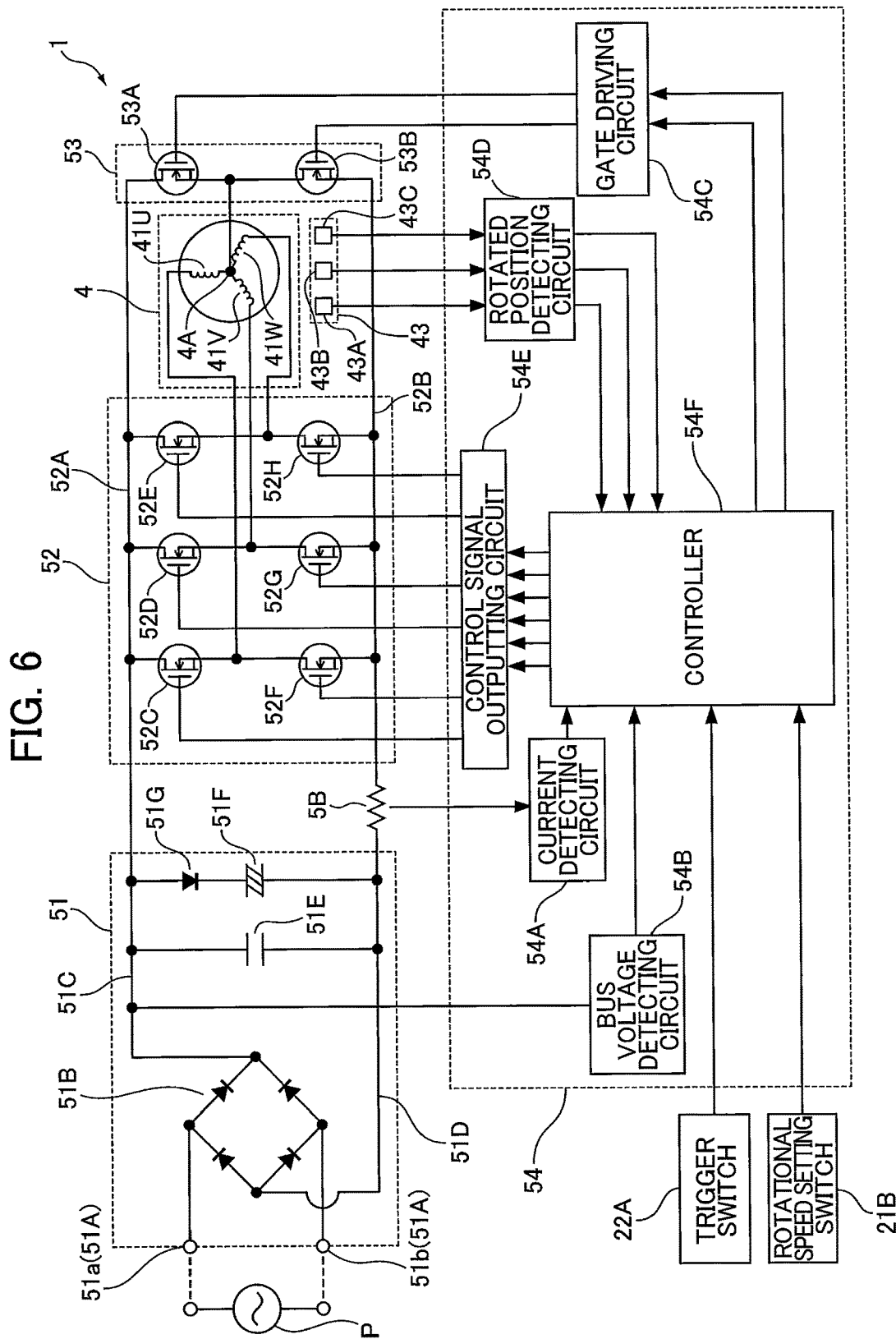
FIG. 6 is a circuit diagram that includes a block diagram and illustrates electrical structures of the motor and a control circuit section of the electric circular saw according to the first embodiment of the present invention.

Next, the motor 4 will be described. As illustrated in FIGS. 4 through 6, the motor 4 is a three-phase brushless motor provided with a stator 41 having three-phase windings, a rotor 42, a position-detecting unit 43, and a rotational shaft 44. FIG. 5 is a cross-sectional view along V-V in FIG. 4 and illustrates the interior of the motor 4. FIG. 6 is a circuit diagram that includes a block diagram and illustrates the electrical structures of the motor 4 and a control circuit section 54 described later.

The stator 41 is provided with a cylindrical part 41A, six teeth 41B-41G, and three-phase windings, namely, a U-phase winding 41U, a V-phase winding 41V, and a W-phase winding 41W. The cylindrical part 41A has a circular tube shape elongated in the left-right direction. As illustrated in FIG. 5, each of the six teeth 41B-41G protrudes inward along a radial direction of the cylindrical part 41A from the inner circumferential surface of the cylindrical part 41A. The teeth 41B-41G are arranged in the circumferential direction of the cylindrical part 41A at approximately equal intervals.

As illustrated in FIG. 5, the U-phase winding 41U, the V-phase winding 41V, and the W-phase winding 41W are star-connected. As illustrated in FIG. 6, these windings are wound around the teeth 41B-41G. Specifically, as illustrated in FIG. 5, the U-phase winding 41U is wound around the tooth 41B and the tooth 41E. The tooth 41E is positioned on the side of the axial center of the cylindrical part 41A opposite the tooth 41B. The turn ratio in the section of the U-phase winding 41U wound about the tooth 41B is the same as the turn ratio in the section wound about the tooth 41E. In addition, the V-phase winding 41V is wound around the tooth 41C and the tooth 41F. The tooth 41F is positioned on the side of the center of the cylindrical part 41A opposite the tooth 41C. The W-phase winding 41W is wound around the tooth 41D and the tooth 41G. The tooth 41G is positioned on the side of the center of the cylindrical part 41A opposite the tooth 41D. The U-phase winding 41U, the V-phase winding 41V, and the W-phase winding 41W are an example of the "plurality of windings" in the present invention.

As illustrated in FIGS. 4 and 5, the rotor 42 has a cylindrical shape that is elongated in the left-right direction. The rotor 42 is provided to be rotatable relative to the stator 41. The rotor 42 includes permanent magnets 42A and 42B. The permanent magnets 42A and 42B are disposed on the peripheral portion of the rotor 42 and oppose the teeth 41B-41G. Further, the permanent magnets 42A and 42B are arranged so that their magnetic poles are at equal intervals along the circumferential direction of the rotor 42 such that the N pole and S pole of the permanent magnet 42A and the N pole and S pole of the permanent magnet 42B are arranged in order in the counterclockwise direction.

As illustrated in FIGS. 5 and 6, the position-detecting unit 43 is provided with Hall ICs 43A-43C for detecting the rotated position of the rotor 42 relative to the stator 41. The Hall ICs 43A-43C are disposed at approximately 60° intervals in the circumferential direction of the stator 41 so as to oppose the permanent magnets 42A and 42B. More specifically, the Hall IC 43A is disposed between the tooth 41B and the tooth 41C, the Hall IC 43B is disposed between the tooth 41F and the tooth 41G, and the Hall IC 43C is disposed between the tooth 41G and the tooth 41B. The Hall ICs 43A-43C output to the control board unit 5 digital signals (high signals or low signals) that correspond to the poles of the neighboring permanent magnets 42A and 42B. Specifically, each of the Hall ICs 43A-43C outputs a low signal when near and opposite an N pole and outputs a high signal when near and opposite an S pole. The control board unit 5 calculates the rotated position of the rotor 42 relative to the stator 41 based on the digital signals outputted from the Hall ICs 43A-43C. The digital signals outputted from the Hall ICs 43A-43C and the calculation of the rotated position will be described later.

The rotational shaft 44 extends in the left-right direction and is disposed so as to be capable of rotating together with the rotor 42. The rotational shaft 44 is driven to rotate by the rotation of the rotor 42. A fan 44A is provided on the rotational shaft 44 and is capable of rotating coaxially with the same. The fan 44A rotates when the rotational shaft 44 is driven to rotate and serves to cool the motor 4 and the control board unit 5. The rotational shaft 44 is connected to the saw blade 8 through a reduction mechanism (not illustrated). The saw blade 8 is rotated by the rotational drive of the rotational shaft 44.

Next, the control board unit 5 will be described. As illustrated in FIGS. 4 and 6, the control board unit 5 includes a circuit board 5A, a voltage conversion circuit 51, an inverter circuit 52, a bridge circuit 53, and the control circuit section 54. The voltage conversion circuit 51, the inverter circuit 52, the bridge circuit 53, and the control circuit section 54 are mounted on the circuit board 5A.

The voltage conversion circuit 51 converts AC voltage supplied from the commercial AC power supply P into a DC pulsating voltage that periodically varies. As illustrated in FIG. 6, the voltage conversion circuit 51 includes a connection terminal part 51A, a diode bridge circuit 51B, a first positive line 51C and a first negative line 51D, a first capacitor 51E, a reverse current prevention diode 51G, and a second capacitor 51F. The voltage conversion circuit 51 is an example of the "converting means" in the present invention, and the DC pulsating voltage is an example of the "varying DC voltage" in the present invention.

The connection terminal part 51A includes a positive connecting terminal 51a and a negative connecting terminal 51b. The positive connecting terminal 51a and the negative connecting terminal 51b are connected to the commercial AC power supply P by plugging the power cord 21A into the commercial AC power supply P. The diode bridge circuit 51B is connected to the connection terminal part 51A. The diode bridge circuit 51B full-wave rectifies the AC voltage inputted from the commercial AC power supply P via the connection terminal part 51A to convert the AC voltage into voltage having a full-wave rectified waveform, and outputs the full-wave rectified voltage.

The first positive line 51C and the first negative line 51D constitute a conduction path along which the DC pulsating voltage outputted from the voltage conversion circuit 51 is supplied to the inverter circuit 52. Note that the first negative line 51D is connected to ground GND (not illustrated). The first capacitor 51E is a film capacitor having a low capacitance (between 4.7 and 10 μf, and preferably 4.7 μF) and is provided for absorbing noise in the high-frequency range. The first capacitor 51E is connected between the first positive line 51C and the first negative line 51D. The reverse current prevention diode 51G is connected in series with the second capacitor 51F between the first positive line 51C and the first negative line 51D. The reverse current prevention diode 51G prevents charge accumulated in the second capacitor 51F from flowing in reverse to the first positive line 51C. The second capacitor 51F is an electrolytic capacitor with a capacitance of 27-68 μf (and preferably 27 μF) and is provided for absorbing noise different from the frequency range of noise absorbed by the first capacitor 51E. The second capacitor 51F is connected between the cathode of the reverse current prevention diode 51G and the first negative line 51D.

As described above, since the present embodiment uses the small-capacitance first capacitor 51E provided for absorbing noise in the high-frequency range and the second capacitor 51F provided via the reverse current prevention diode 51G, the full-wave rectified voltage obtained through the full-wave rectification performed by the diode bridge circuit 51B is smoothed only slightly. Consequently, the waveform of the DC pulsating voltage outputted from the first positive line 51C of the voltage conversion circuit 51 very closely resembles the full-wave rectified waveform (hereinafter this waveform will be called a near-full-wave rectified waveform). This waveform produces periods in which the DC pulsating voltage is lower than the induced voltage that is produced in the motor 4 by the rotation of the rotor 42. During these periods, electric current does not flow through the motor 4. That is, the first capacitor 51E in the present embodiment has a capacitance that can only smooth the full-wave rectified voltage outputted by the diode bridge circuit 51B to a degree that still produces periods during which electric current does not flow through the motor 4.

The inverter circuit 52 includes a second positive line 52A and a second negative line 52B, and six switching elements 52C-52H connected in a three-phase bridge formation. The second positive line 52A constitutes the bus of the inverter circuit 52 and is connected to the first positive line 51C of the voltage conversion circuit 51. The second negative line 52B is connected to the first negative line 51D via a current detecting resistor 5B. The second positive line 52A and the second negative line 52B output the DC pulsating voltage inputted from the voltage conversion circuit 51 to the U-phase winding 41U, the V-phase winding 41V, and the W-phase winding 41W via the switching elements 52C-52H and the bridge circuit 53. Each of the second positive line 52A and the second negative line 52B is an example of the "output line" in the present invention.

The switching elements 52C-52H are MOSFETs, for example, and are connected between the second positive line 52A and the second negative line 52B and the three-phase windings, i.e., the U-phase winding 41U, the V-phase winding 41V, and the W-phase winding 41W. More specifically, the gate of each of the switching elements 52C-52H is connected to the control circuit section 54, while the drain or source of each of the switching elements 52C-52H is connected to one of the star-connected three-phase windings, i.e., U-phase winding 41U, the V-phase winding 41V, and the W-phase winding 41W. The switching elements 52C-52H are switched on and off in accordance with the drive signals outputted from the control circuit section 54.

The switching element 52C in its ON state, the switching element 52D in its ON state, and the switching element 52E in its ON state connect the U-phase winding 41U, the V-phase winding 41V, and the W-phase winding 41W to the second positive line 52A, respectively. The switching element 52F in its ON state, the switching element 52G in its ON state, and the switching element 52H in its ON state connect the U-phase winding 41U, the V-phase winding 41V, and the W-phase winding 41W to the second negative line 52B, respectively.

The bridge circuit 53 connects a neutral point 4A of the star-connected three-phase windings, i.e., the U-phase winding 41U, the V-phase winding 41V, and the W-phase winding 41W selectively to one of the second positive line 52A and the second negative line 52B. The bridge circuit 53 is provided with switching elements 53A and 53B.

The switching element 53A is a MOSFET, for example. The drain of the switching element 53A is connected to the second positive line 52A, the source is connected to the neutral point 4A and the drain of the switching element 53B, and the gate is connected to the control circuit section 54. The switching element 53A is switched on and off according to a drive signal outputted from the control circuit section 54. The switching element 53A in its ON state connects the second positive line 52A to the neutral point 4A while bypassing all of the U-phase winding 41U, the V-phase winding 41V, and the W-phase winding 41W. The switching element 53A in its OFF state interrupts the bypass connection between the second positive line 52A and the neutral point 4A.

The switching element 53B is a MOSFET, for example. The drain of the switching element 53B is connected to the source of the switching element 53A and the neutral point 4A. The source of the switching element 53B is connected to the second negative line 52B. The gate of the switching element 53B is connected to the control circuit section 54. As with the switching element 53A, the switching element 53B is switched on and off according to a drive signal outputted from the control circuit section 54. The switching element 53B in its ON state connects the second negative line 52B to the neutral point 4A while bypassing the U-phase winding 41U, the V-phase winding 41V, and the W-phase winding 41W. The switching element 53B in its OFF state interrupts the bypass connection between the second negative line 52B and the neutral point 4A.

In the present embodiment, the winding(s) (phase(s)) to be connected between the second positive line 52A and the second negative line 52B are selected from among the U-phase winding 41U, the V-phase winding 41V, and the W-phase winding 41W by turning on and off the switching elements 52C-52H of the inverter circuit 52 and the switching elements 53A and 53B of the bridge circuit 53. Thus, the DC pulsating voltage outputted from the voltage conversion circuit 51 can be applied to the selected winding(s).

The control circuit section 54 includes a current detecting circuit 54A, a bus voltage detecting circuit 54B, a gate driving circuit 54C, a rotated position detecting circuit 54D, a control signal outputting circuit 54E, and a controller 54F. The control circuit section 54 controls the drive of the motor 4.

The current detecting circuit 54A detects the current flowing through the motor 4, i.e., the current flowing in the first negative line 51D and the second negative line 52B, by reading the voltage drop in the current detecting resistor 5B, and outputs a signal indicating the detection results, i.e., the electric current value to the controller 54F.

The bus voltage detecting circuit 54B is connected to the first positive line 51C and detects voltage appearing at the first positive line 51C (voltage across the first positive line 51C and the first negative line 51D) and outputs a bus voltage signal based on this detected voltage to the controller 54F. When the rotor 42 is rotating, the voltage appearing in the first positive line 51C is a combination of the DC pulsating voltage outputted by the voltage conversion circuit 51 and the induced voltage generated in the U-phase winding 41U, the V-phase winding 41V, and the W-phase winding 41W. This is because not only the DC pulsating voltage but also the induced voltage generated in the U-phase winding 41U, the V-phase winding 41V, and the W-phase winding 41W by the rotation of the rotor 42 is applied to the first positive line 51C. Accordingly, the bus voltage signal indicates the DC pulsating voltage during periods for which the DC pulsating voltage is higher than the induced voltage and indicates the induced voltage during periods for which the DC pulsating voltage is less than or equal to the induced voltage. Note that the voltage appearing in the first positive line 51C is equivalent to the voltage appearing in the second positive line 52A in the present embodiment. The bus voltage detecting circuit 54B is an example of the "voltage detecting means" in the present invention.

Here, the induced voltage appearing in the first positive line 52A via the inverter circuit 52 will be described while referring to FIGS. 7(a) and 7(b). FIG. 7 is a diagram describing the induced voltage appearing at the second positive line 52A, with (a) illustrating the electrical structures of the motor 4 and the inverter circuit 52 when the induced voltage generated in each of the three-phase windings is treated as the power supply and (b) illustrating the induced voltage generated in each of the three-phase windings and the induced voltage appearing in the second positive line 52A.

As illustrated in FIG. 7(a), the motor 4 can be considered a three-phase power supply when the induced voltage produced in each of the U-phase winding 41U, the V-phase winding 41V, and the W-phase winding 41W is treated as a power source. Accordingly, as illustrated in FIG. 7(b), the induced voltage produced in each of the U-phase winding 41U, the V-phase winding 41V, and the W-phase winding 41W by the rotation of the rotor 42 constitutes a three-phase AC voltage whose phases are shifted by 120° from one another. While not illustrated in FIG. 6, as illustrated in FIG. 7(a), free-wheeling diodes 521-52N are connected in parallel to the switching elements 52C-52H of the inverter circuit 52, respectively. Accordingly, the three-phase AC voltage generated in the motor 4 is rectified by the freewheeling diodes 521-52N and combined in the second positive line 52A to produce voltage that slightly pulsates as illustrated in FIG. 7(b). Note that since the slightly pulsating voltage is considered nearly constant from a broad perspective, the voltage is depicted with a straight line in the other drawings.

Returning to FIG. 6, the gate driving circuit 54C is connected to the gate of each of the switching elements 53A and 53B and selectively applies voltage to one of the gates on the basis of drive signals inputted from the controller 54F. Of the switching elements 53A and 53B, one switching element whose gate has been applied with voltage is placed in its ON state, while the remaining switching element whose gate has not been applied with voltage is placed in its OFF state.

The rotated position detecting circuit 54D receives digital signal outputted from each of the three Hall ICs 43A-43C of the motor 4 and outputs rotated position information based on the pattern of these three digital signals to the controller 54F.

Figure 8:
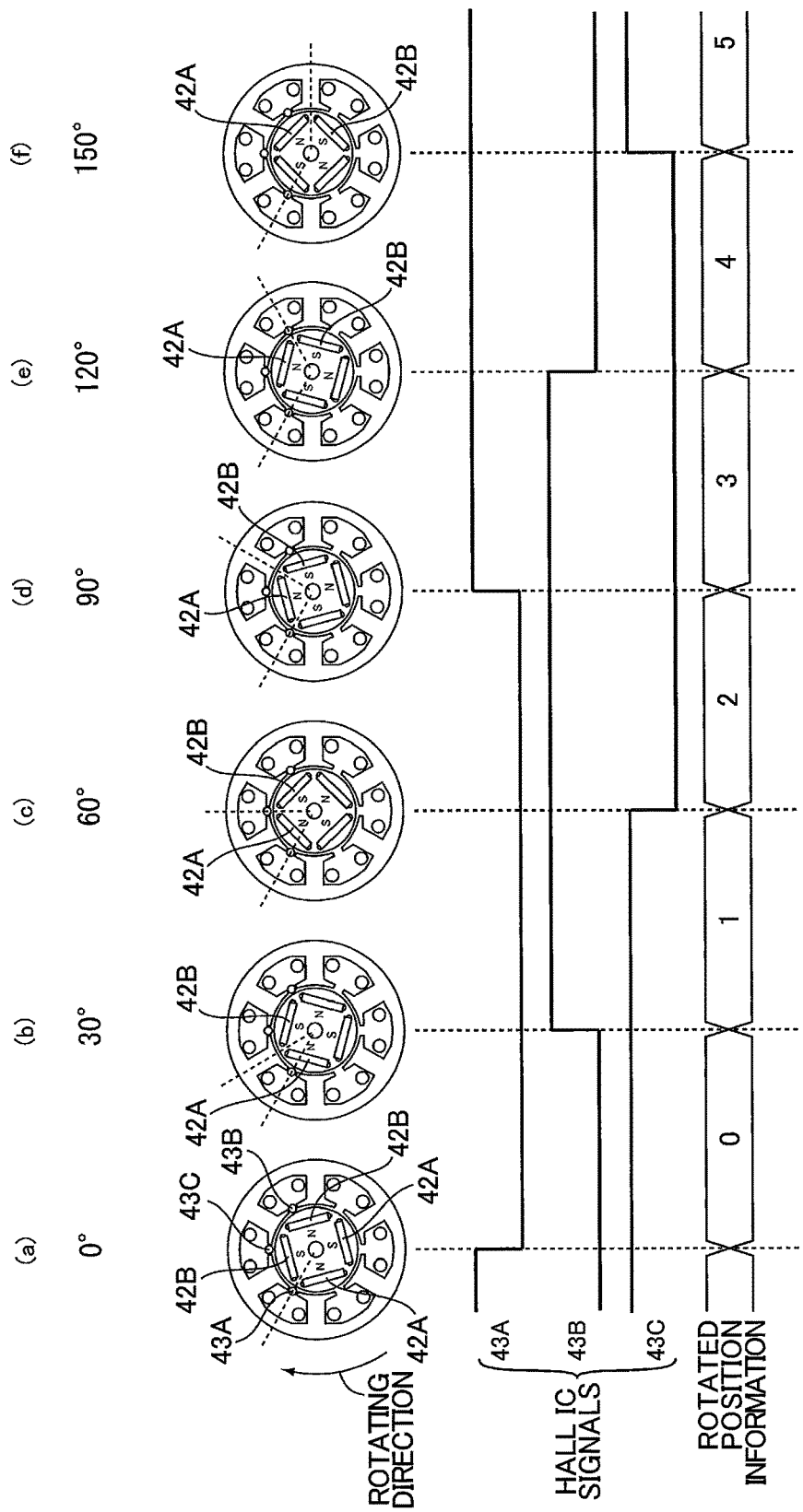
FIG. 8 is a diagram illustrating correspondences between rotated positions of a rotor, digital signals outputted from Hall ICs, and rotated position information outputted from rotated position detecting circuit in the electric circular saw according to the first embodiment of the present invention.

Here, the digital signals outputted from the Hall ICs 43A-43C on the basis of the rotated position of the rotor 42 relative to the stator 41, and the rotated position information outputted by the rotated position detecting circuit 54D will be described with reference to FIG. 8. FIG. 8 illustrates the correspondences between the rotated positions of the rotor 42, the digital signals outputted from the Hall ICs 43A-43C, and the rotated position information outputted from the rotated position detecting circuit 54D when the rotated position of the rotor 42 is (a) 0°, (b) 30°, (c) 60°, (d) 90°, (e) 120°, and (f) 150°.

First, as illustrated in FIG. 8(a), the rotated position of the rotor 42 relative to the stator 41 when the portion of the rotor 42 between the N pole of the permanent magnet 42A and the S pole of the permanent magnet 42B (hereinafter called the interpolar part) faces the Hall IC 43A (that is, when the interpolar part of the rotor 42 is substantially in the same position as the Hall IC 43A in the rotating direction of the rotor 42) is defined as 0° (mechanical angle).

When the rotor 42 rotates 30° clockwise from the rotated position of 0°, the rotor 42 is at the rotated position of 30°, and the interpolar part is positioned between the Hall IC 43A and the Hall IC 43C. While the rotor 42 rotates between the rotated positions 0° and 30°, the Hall IC 43A faces an N pole and therefore outputs a low signal to the rotated position detecting circuit 54D, the Hall IC 43B similarly faces an N pole and thus outputs a low signal, but the Hall IC 43C faces an S pole and therefore outputs a high signal. Since the pattern of digital signals outputted by the Hall ICs 43A, 43B, and 43C has the sequence low, low, and high during this period, the rotated position detecting circuit 54D outputs "0" to the controller 54F as the rotated position information.

When the rotor 42 rotates 30° clockwise from the rotated position of 30°, the rotor 42 is at the rotated position of 60° and the interpolar part is positioned at a position facing the Hall IC 43C. While the rotor 42 rotates from the rotated positions of 30° to 60°, the Hall IC 43A faces an N pole and therefore outputs a low signal to the rotated position detecting circuit 54D, the Hall IC 43B faces an S pole and therefore outputs a high signal, and the Hall IC 43C similarly faces an S pole and outputs a high signal. Since the pattern of digital signals during this period has the sequence low, high, and high for the Hall ICs 43A, 43B, and 43C, the rotated position detecting circuit 54D outputs "1" to the controller 54F as the rotated position information.

When the rotor 42 rotates from the rotated position of 60° and the rotated position of rotor 42 is between the rotated positions of 60° and 90°, the Hall ICs 43A, 43B, and 43C output a low signal, a high signal, and a low signal, respectively. Since the pattern of digital signals during this period is low, high, and low, the rotated position detecting circuit 54D outputs "2" to the controller 54F as the rotated position information. When the rotor 42 rotates from the rotated position of 90° and the rotated position of rotor 42 between the rotated positions of 90° and 120°, the Hall ICs 43A, 43B, and 43C output a high signal, a high signal, and a low signal, respectively. Since the pattern of digital signals during this period is high, high, and low, the rotated position detecting circuit 54D outputs "3" to the controller 54F as the rotated position information.

When the rotor 42 rotates farther from the rotated position of 120° and the rotated position of the rotor 42 is between the rotated positions of 120° and 150°, the Hall ICs 43A, 43B, and 43C output a high signal, a low signal, and a low signal, respectively. Since the pattern of digital signals during this period is high, low, and low, the rotated position detecting circuit 54D outputs "4" to the controller 54F as the rotated position information. When the rotor 42 rotates from the rotated position of 150° and the rotated position of the rotor 42 is between the rotated positions of 150° and 180°, the Hall ICs 43A, 43B, and 43C output a high signal, a low signal, and a high signal, respectively. Since the pattern of digital signals during this period is high, low, and high, the rotated position detecting circuit 54D outputs "5" to the controller 54F as the rotated position information.

Further, while the rotor 42 rotates from the rotated position of 180° to the rotated position of 360°, the digital signals outputted from the corresponding Hall ICs 43A-43C and the rotated position information outputted from the rotated position detecting circuit 54D are identical to those outputted during the period of time from the rotated position of 0° to the rotated position of 180°. The pattern of digital signals and the rotated position information are repeated as described above each time the rotor 42 rotates 180° relative to the stator 41. That is, one period of the pattern of digital signals and one period of the rotated position information correspond to the period of time of 180° rotation of the rotor 42 relative to the stator 41. Accordingly, the repeated period of the rotated position information, i.e., the electrical angle between 0° and 360°, corresponds to the 180° mechanical angle of the rotor 42.

Returning to FIG. 6, the control signal outputting circuit 54E is connected to the gate of each of the switching elements 52C-52H and applies voltage to each gate based on drive signals inputted from the controller 54F. Of the switching elements 52C-52H, switching elements whose gate has been applied with voltage is in their ON states, and switching elements whose gate has not been applied with voltage is in their OFF states.

The controller 54F includes a central processing unit (CPU) (not illustrated) for outputting drive signals on the basis of a process program and data; ROM (not illustrated) for storing the process program, control data, various threshold values and the like; and RAM (not illustrated) for temporarily storing data.

The controller 54F controls the drive of the motor 4 by performing conduction control using the inverter circuit 52 and the bridge circuit 53 to rotate the rotor 42 in a prescribed rotating direction. In this conduction control, the controller 54F outputs drive signals to the control signal outputting circuit 54E for setting switching elements, among the switching elements 52C-52H of the inverter circuit 52 and the switching elements 53A and 53B of the bridge circuit 53, to their ON states on the basis of the rotated position information outputted from the rotated position detecting circuit 54D. In this way, the controller 54F switches the winding(s) (conducting winding(s)) to be connected between the second positive line 52A and the second negative line 52B among the three-phase windings. Here, the drive signals for turning on and off the switching elements 52F-52H and the switching element 53B which are connected to the negative power side are outputted as PWM signals. The controller 54F adjusts the quantity of power supplied to the motor 4 by modifying the duty ratio of the PWM signals on the basis of a signal indicating a target speed. This signal indicating the target speed is outputted from the rotational speed setting switch 21B. By adjusting the quantity of power supplied to the motor 4, the controller 54F controls the speed of the motor 4 so that the speed of the motor 4 can be maintained at the selected target speed. The controller 54F, the inverter circuit 52, and the bridge circuit 53 are an example of the "conduction switching means" in the present invention.

Further, the controller 54F calculates the speed of the rotor 42 from the rotated position information inputted from the rotated position detecting circuit 54D. The controller 54F also calculates the induced voltage generated in the three-phase windings from the calculated speed. The controller 54F and the rotated position detecting circuit 54D are an example of the "induced voltage calculating means" and the "rotational speed detecting means" in the present invention.

Further, the controller 54F performs, as the conduction control, first conduction control and second conduction control. The controller 54F switches the conduction control between the first conduction control and the second conduction control on the basis of: the induced voltage calculated above; and the voltage at the first positive line 51C indicated by the bus voltage signal outputted from the bus voltage detecting circuit 54B.

Figure 9:
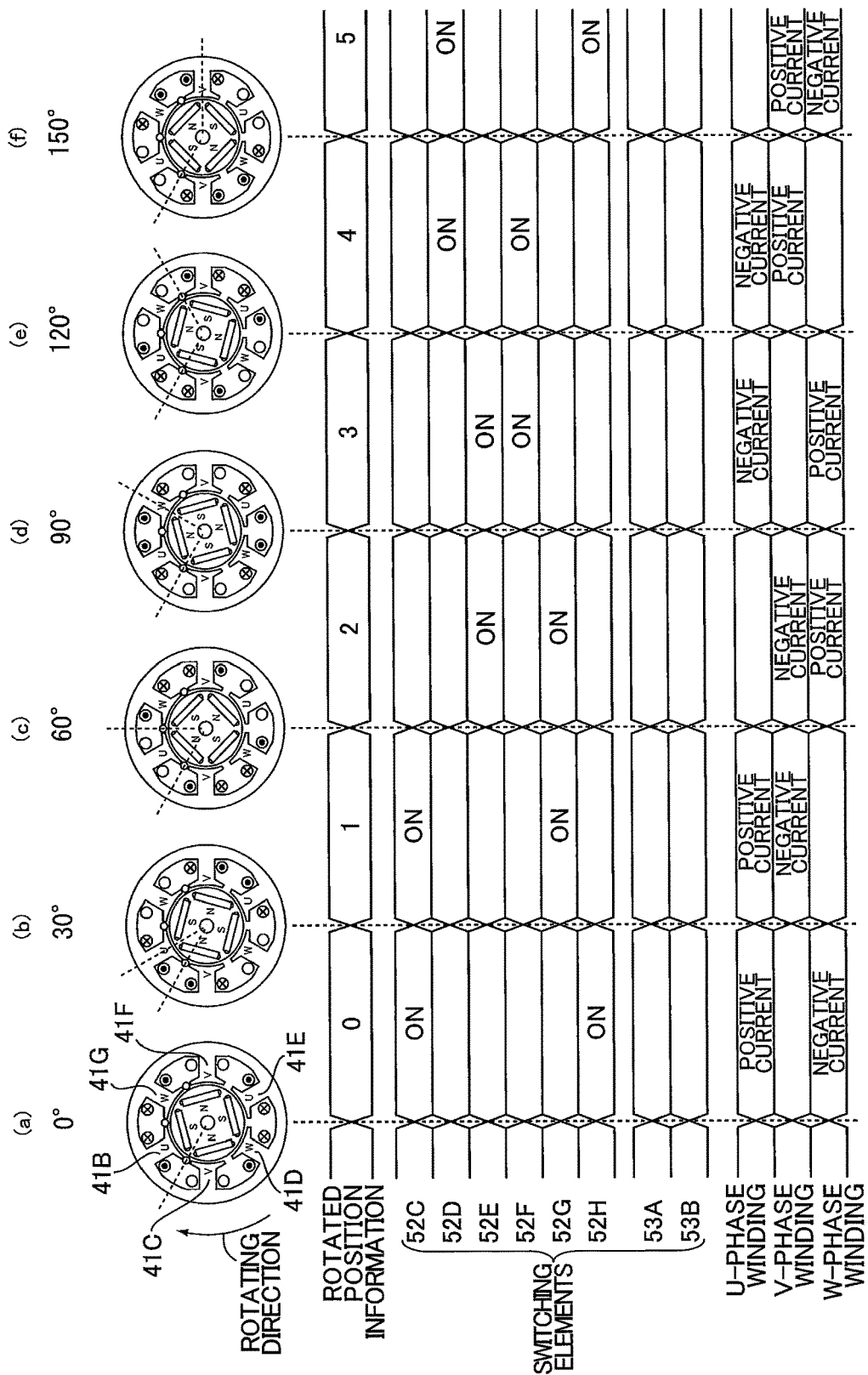
FIG. 9 is a diagram illustrating relationship between the rotated position information and conducting windings during first conduction control performed by the electric circular saw according to the first embodiment of the present invention.
Figure 10:
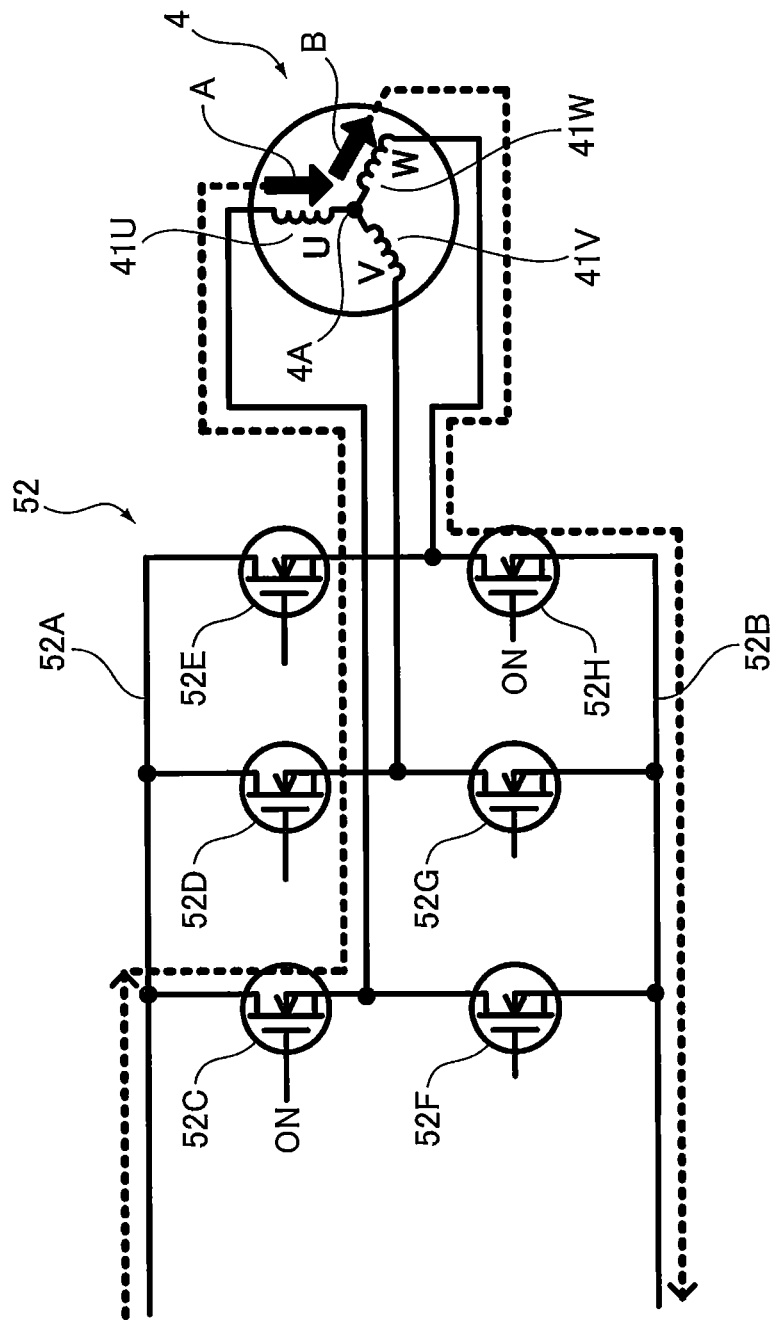
FIG. 10 is a diagram illustrating a conducting direction in which current flows through each of the conducting windings in the first conduction control performed by the electric circular saw according to the first embodiment of the present invention.

Here, the first conduction control will be described with reference to FIGS. 9 and 10. FIG. 9 illustrates the relationships among rotated position information, conducting windings, and switching elements set to the ON state during the first conduction control when the rotated position of the rotor 42 is (a) 0°, (b) 30°, (c) 60°, (d) 90°, (e) 120°, (f) 150°. FIG. 10 illustrates the conducting direction in which current flows through each of the conducting windings in the first conduction control.

In the first conduction control, the controller 54F switches the six switching elements 52C-52H of the inverter circuit 52 on and off while maintaining the switching elements 53A-53B of the bridge circuit 53 at their OFF states in order to rotate the rotor 42 in a prescribed direction (clockwise in FIG. 9). Further, in the first conduction control, two of the three-phase windings are set as conducting windings connected in series between the second positive line 52A and the second negative line 52B at all times, and the rotor 42 is rotated in the prescribed direction by switching the conducting windings on the basis of the rotated position information. In other words, the number of conducting windings (the number of conducting phases) in the first conduction control is always two and the maximum number of windings connected in series between the second positive line 52A and the second negative line 52B (the maximum series number) is two. Since two of the three-phase windings always serve as conducting windings connected in series between the second positive line 52A and the second negative line 52B, current flows through the motor 4 only when the DC pulsating voltage is higher than the combination of induced voltages generated in the two phases that are connected in series. The number 2 denoting the number of conducting windings in the first conduction control is an example of the "first conduction number" in the present invention, and the number 2 denoting the maximum series number in the first conduction control is an example of the "first series number" in the present invention.

As illustrated in FIGS. 9(a) and (b), between the rotated positions of 0° and 30°, the rotated position detecting circuit 54D outputs "0" to the controller 54F as the rotated position information. For a period of time during which "0" is outputted as the rotated position information, in order to rotate the rotor 42 clockwise in FIG. 9 (the rotating direction indicated in FIG. 9), the controller 54F outputs drive signals to the control signal outputting circuit 54E for setting the switching elements 52C and 52H of the inverter circuit 52 to their ON states.

When the switching elements 52C and 52H are brought into their ON states, the U-phase winding 41U and the W-phase winding 41W (two of the three phases) are connected in series between the inverter circuit 52 and the second negative line 52B, as illustrated in FIG. 10. In this connected state, current indicated by arrow A in FIG. 10 flows through the U-phase winding 41U in the direction from the second positive line 52A to the neutral point 4A, and current indicated by arrow B in FIG. 10 flows through the U-phase winding 41U in the direction from the neutral point 4A to the second negative line 52B. For convenience of description, hereinafter, current flowing in a direction from the second positive line 52A to the neutral point 4A as indicated by arrow A will be called "positive current," while current flowing in a direction from the neutral point 4A to the second negative line 52B as indicated by arrow B will be called "negative current." Note that the bridge circuit 53 has been omitted from FIG. 10 to avoid complicating the drawing.

When positive current flows through the U-phase winding 41U and negative current flows through the W-phase winding 41W, the teeth 41B and 41E about which the U-phase winding 41U is wound become S poles and the teeth 41D and 41G about which the W-phase winding 41W is wound become N poles. As illustrated in FIG. 9(a), while the rotated position is between 0° and 30°, the teeth 41B and 41E constituting S poles face the downstream side parts in the rotating direction of the corresponding S poles of the rotor 42. Consequently, a force of repulsion acts between the teeth 41B and 41E and the S poles of the rotor 42, thereby producing torque for rotating the rotor 42 clockwise in FIG. 9. Also, during this period, the teeth 41D and 41G around which the W-phase winding 41W is wound face the upstream side parts in the rotating direction of the corresponding S poles of the rotor 42. Consequently, a force of attraction acts between the teeth 41D and 41G and the S poles of the rotor 42, thereby producing torque that rotates the rotor 42 clockwise.

As illustrated in FIGS. 9(b) and (c), the rotated position detecting circuit 54D outputs "1" as the rotated position information between the rotated positions of 30° and 60°. While the rotated position detecting circuit 54D outputs "1" as the rotated position information, the controller 54F outputs drive signals to the control signal outputting circuit 54E for setting the switching elements 52C and 52G of the inverter circuit 52 to their ON states.

When the switching elements 52C and 52G are brought into their ON states, the U-phase winding 41U and the V-phase winding 41V (two of the three phases) are connected in series between the second positive line 52A and the second negative line 52B, and positive current flows through the U-phase winding 41U while negative current flows through the V-phase winding 41V. In this period, the teeth 41B and 41E about which the U-phase winding 41U is wound form S poles while the teeth 41C and 41F about which the V-phase winding 41V is wound form N poles, thereby generating torque.

As illustrated in FIGS. 9(c) and (d), while the rotated position is between 60° and 90°, the rotated position detecting circuit 54D outputs "2" as the rotated position information and the controller 54F sets the switching elements 52E and 52G to their ON states. During this period, the W-phase winding 41W and the V-phase winding 41V (two of the three phases) are connected in series between the second positive line 52A and the second negative line 52B, and positive current flows through the W-phase winding 41W while negative current flows through the V-phase winding 41V.

Also, during this period, the teeth 41D and 41G about which the W-phase winding 41W is wound form S poles while the teeth 41C and 41F about which the V-phase winding 41V is wound form N poles, thereby producing torque.

As illustrated in FIGS. 9(d) and (e), between the rotated positions of 90° and 120°, the rotated position detecting circuit 54D outputs "3" as the rotated position information and the controller 54F sets the switching elements 52E and 52F to their ON states. During this period, the W-phase winding 41W and the U-phase winding 41U (two of the three phases) are connected in series between the second positive line 52A and the second negative line 52B, and positive current flows through the W-phase winding 41W while negative current flows through the U-phase winding 41U. Also, during this period, the teeth 41D and 41G about which the W-phase winding 41W is wound form S poles while the teeth 41B and 41E about which the U-phase winding 41U is wound form N poles, thereby producing torque.

As illustrated in FIGS. 9(e) and (f), between the rotated positions of 120° and 150°, the rotated position detecting circuit 54D outputs "4" as the rotated position information and the controller 54F sets the switching elements 52D and 52F to their ON states. During this period, the V-phase winding 41V and the U-phase winding 41U (two of the three phases) are connected in series between the second positive line 52A and the second negative line 52B, and positive current flows through the V-phase winding 41V while negative current flows through the U-phase winding 41U. Also, during this period, the teeth 41C and 41F about which the V-phase winding 41V is wound form S poles while the teeth 41B and 41E about which the U-phase winding 41U is wound form N poles, thereby producing torque.

As illustrated in FIGS. 9(f) and (a), between the rotated positions of 150° and 180°, the rotated position detecting circuit 54D outputs "5" as the rotated position information and the controller 54F sets the switching elements 52D and 52H to their ON states. During this period, the V-phase winding 41V and the W-phase winding 41W (two of the three phases) are connected in series between the second positive line 52A and the second negative line 52B, and positive current flows through the V-phase winding 41V while negative current flows through the W-phase winding 41W. Also, during this period, the teeth 41C and 41F about which the V-phase winding 41V is wound form S poles and the teeth 41D and 41G about which the W-phase winding 41W is wound form N poles, thereby producing torque.

Figure 11:
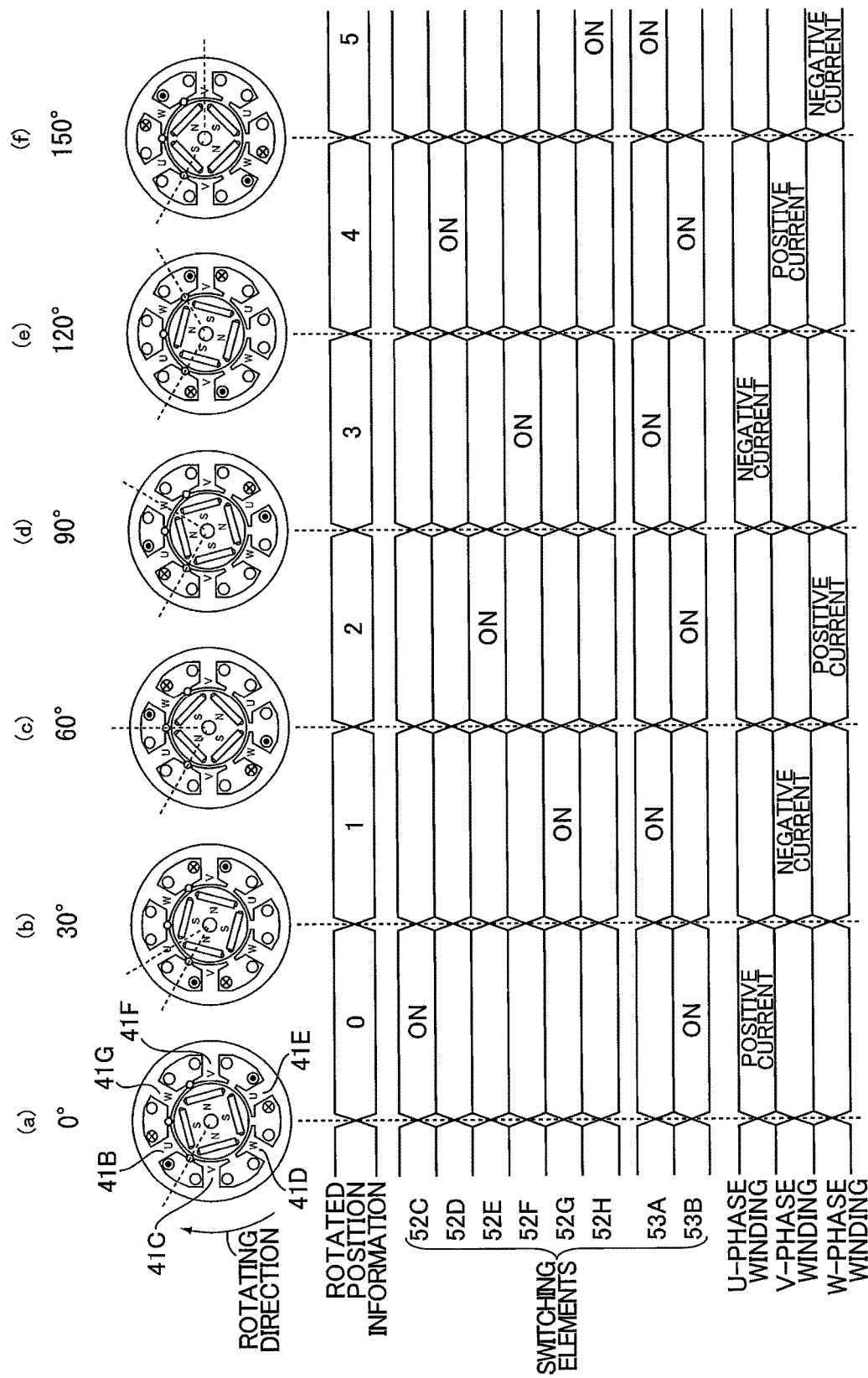
FIG. 11 is a diagram illustrating relationships among the rotated position information, conducting windings, and switching elements set to their ON states during second conduction control performed by the electric circular saw according to the first embodiment of the present invention.
Figure 12:
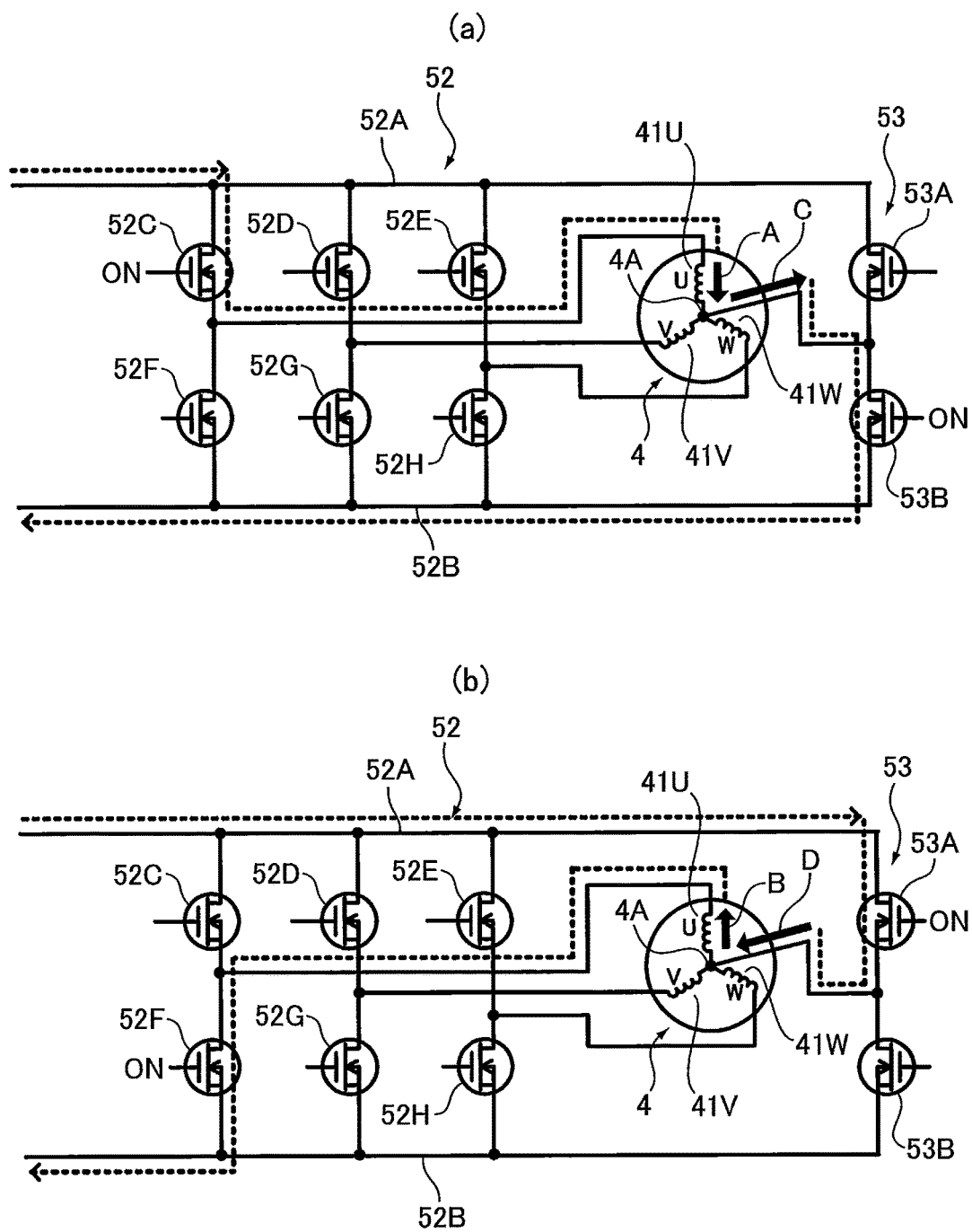
FIG. 12 is a diagram illustrating a conducting direction in which current flows through the conducting winding during the second conduction control performed by the electric circular saw according to the first embodiment of the present invention.

Next, the second conduction control will be described with reference to FIGS. 11 and 12. FIG. 11 illustrates the relationships among the rotated position information, conducting windings, and switching elements set to their ON states during the second conduction control, when the rotated position of the rotor 42 is (a) 0°, (b) 30°, (c) 60°, (d) 90°, (e) 120°, and (f) 150°. FIG. 12 illustrates the conducting direction in which current flows through the conducting winding during the second conduction control when the rotated position is (a) 0°-30° and (b) 90°-120°.

In the second conduction control, the controller 54F switches the switching elements 52C-52H of the inverter circuit 52 and the switching elements 53A and 53B of the bridge circuit 53 on and off to rotate the rotor 42 in a prescribed direction. Also, during the second conduction control, only one of the three-phase windings is always connected between the second positive line 52A and the second negative line 52B as the conducting winding, and the conducting winding is switched on the basis of the rotated position information, thereby causing the rotor 42 to rotate in the prescribed direction. In other words, the number of conducting windings in the second conduction control (the number of conducting phases) is always one, and the maximum number of windings connected in series between the second positive line 52A and the second negative line 52B (the maximum series number) is one. Since only one of the three-phase windings is connected between the second positive line 52A and the second negative line 52B as the conducting winding in the second conduction control, current flows through the motor 4 only when the DC pulsating voltage is higher than the induced voltage generated in this phase. Note that the induced voltage produced in one phase is approximately half the combination of induced voltages produced in two phases connected in series. The number 1 denoting the number of conducting windings in the second conduction control is an example of "the second conduction number" in the present invention, and the number 1 denoting the maximum series number in the second conduction control is an example of the "second series number" in the present invention.

As illustrated in FIGS. 11(a)-(f), the rotated position information outputted from the rotated position detecting circuit 54D on the basis of the rotated position of the rotor 42 in the second conduction control is identical to that used in the first conduction control, but the drive signals outputted by the controller 54F on the basis of the rotated position information, the switching elements set to the ON states, and the conducting winding differ from those in the first conduction control.

As illustrated in FIGS. 11(a) and (b), in a period of time during the rotated position is between 0° and 30°, in order to rotate the rotor 42 in the prescribed rotating direction (the clockwise direction in FIG. 11), the controller 54F outputs drive signals to the control signal outputting circuit 54E for setting the switching element 52C of the inverter circuit 52 and the switching element 53B of the bridge circuit 53 to their ON states.

When the switching elements 52C and 53B are brought into their ON states, only the U-phase winding 41U (one of the three phases) is connected between the second positive line 52A and the second negative line 52B, as illustrated in FIG. 12(a). In this connected state, positive current flows through the U-phase winding 41U (arrow A), and current flows from the neutral point 4A to the second negative line 52B via the switching element 53B (arrow C), i.e., not through the V-phase winding 41V and the W-phase winding 41W. For convenience of description, current flowing in a direction from the neutral point 4A directly to the second negative line 52B via the switching element 53B rather than through the windings, as indicated by arrow C, will be called "negative bypass current," while current flowing from the second positive line 52A directly to the neutral point 4A via the switching element 53A rather than through the windings will be called "positive bypass current."

When positive current flows through the U-phase winding 41U and negative bypass current flows through the switching element 53B, the teeth 41B and 41E about which the U-phase winding 41U is wound form S poles. As illustrated in FIG. 11(a), while the rotated position is between 0° and 30°, the teeth 41B and 41E forming S poles face the downstream side parts in the rotating direction of the corresponding S poles of the rotor 42. Consequently, a force of repulsion acts between the teeth 41B and 41E and the S poles of the rotor 42, thereby generating torque that rotates the rotor 42 clockwise in FIG. 11. During this period, the V-phase winding 41V and the W-phase winding 41W do not generate a magnetic field caused by electrical conduction and only the U-phase winding 41U produces torque in the rotor 42.

As illustrated in FIG. 11(b), while the rotated position is between 30° and 60°, the controller 54F outputs drive signals to the control signal outputting circuit 54E for setting the switching element 52D of the inverter circuit 52 and the switching element 53A of the bridge circuit 53 to their ON states on the basis of the rotated position information of "1".

When the switching elements 52G and 53A are brought into their ON states, only the V-phase winding 41V (one of the three phases) is connected between the second positive line 52A and the second negative line 52B, and positive bypass current flows through the switching element 53A while negative current flows through the V-phase winding 41V. During this period, the teeth 41C and 41F about which the V-phase winding 41V is wound form N poles, thereby producing torque.

As illustrated in FIG. 11(c), while the rotated position is between 60° and 90°, the controller 54F sets the switching element 52E of the inverter circuit 52 and the switching element 53B of the bridge circuit 53 to their ON states on the basis of the rotated position information "2". During this period, only the W-phase winding 41W (one of the three phases) is connected between the second positive line 52A and the second negative line 52B, and positive current flows through the W-phase winding 41W while negative bypass current flows through the switching element 53B. Also, during this period, the teeth 41D and 41G about which the W-phase winding 41W is wound form S poles, thereby producing torque.

As illustrated in FIG. 11(d), while the rotated position is between 90° and 120°, the controller 54F sets the switching element 52F of the inverter circuit 52 and the switching element 53A of the bridge circuit 53 to their ON states on the basis of the rotated position information of "3". As illustrated in FIG. 12(b), during this period, only the U-phase winding 41U (one of the three phases) is connected between the second positive line 52A and the second negative line 52B, and positive bypass current indicated by arrow D flows through the switching element 53B while negative current indicated by arrow B flows through the U-phase winding 41U. Also, during this period, the teeth 41B and 41E about which the U-phase winding 41U is wound form N poles, thereby generating torque.

As illustrated in FIG. 11(e), while the rotated position is between 120° and 150°, the controller 54F sets the switching element 52D of the inverter circuit 52 and the switching element 53B of the bridge circuit 53 to their ON states on the basis of the rotated position information of "4". During this period, only the V-phase winding 41V (one of the three phases) is connected between the second positive line 52A and the second negative line 52B, and positive current flows through the V-phase winding 41V while negative bypass current flows through the switching element 53B. Also, during this period, the teeth 41C and 41F about which the V-phase winding 41V is wound form S poles, thereby producing torque.

As illustrated in FIG. 11(f), while the rotated position is between 150° and 180°, the controller 54F sets the switching element 52H of the inverter circuit 52 and the switching element 53A of the bridge circuit 53 to their ON states on the basis of the rotated position information of "5". During this period, only the W-phase winding 41W (one of the three phases) is connected between the second positive line 52A and the second negative line 52B, and positive bypass current flows through the switching element 53A while negative current flows through the W-phase winding 41W. Also, during this period, the teeth 41D and 41G about which the W-phase winding 41W is wound form N poles, thereby generating torque.

Next, drive control performed by the controller 54F for driving the motor 4 will be described. In this drive control, the controller 54F switches the conduction control between the first conduction control and the second conduction control described above to modify the number of conducting windings (i.e., the winding inductance). In this way, the controller 54F lengthens the period of time during which current flows through the three-phase windings of the motor 4, i.e., the period of time during torque is generated, thereby suppressing torque ripple.

In the conduction control, only for a period of time during which the DC pulsating voltage (the voltage having a near-full-wave rectified waveform) outputted from the voltage conversion circuit 51 is higher than the combination of induced voltages generated in the conducting windings, current flows through the windings and torque is generated. Hence, in the first conduction control, torque is not produced when the DC pulsating voltage is not higher than the combination of induced voltages generated in the two phases of conducting windings connected in series. However, in the second conduction control, torque is generated when the DC pulsating voltage is higher than the induced voltage generated in the single phase. In other words, the torque generating period if only the first conduction control were performed would be shorter than the torque generating period if only the second conduction control were performed. Further, two phase windings generate torque in the first conduction control, but only one phase winding generates torque in the second conduction control. Hence, torque generated in the first conduction control is greater than torque generated in the second conduction control.

In light of the above, in the drive control performed by the controller 54F, a conduction switching threshold value is set. The conduction switching threshold value is lower than the maximum value (peak value) of the DC pulsating voltage and is higher than the combined voltage of induced voltages generated in two conducting windings (i.e., in two phases). When the DC pulsating voltage is greater than or equal to the conduction switching threshold value, the controller 54F performs the first conduction control as the conduction control in order to prioritize torque. When the DC pulsating voltage drops and becomes lower than the conduction switching threshold value, the controller 54F switches the conduction control to the second conduction control in order to lengthen the period of time during which torque is generated and to suppress torque ripple produced in the motor 4. In the above control, the conduction switching threshold value is set not equivalent to but higher than the combined voltage of induced voltages generated in two conducting windings. Accordingly, before the DC pulsating voltage drops below the combined voltage of induced voltages generated in two conducting windings and torque ceases to be generated, the controller 54F can reliably switch the conduction control to the second conduction control. In other words, the controller 54F switches the conduction control between the first conduction control and the second conduction control in synchronization with the DC pulsating voltage. The conduction switching threshold value is an example of the "voltage threshold value" in the present invention.

Next, the detailed process of drive control performed by the controller 54F will be described with reference to FIG.

Figure 13:
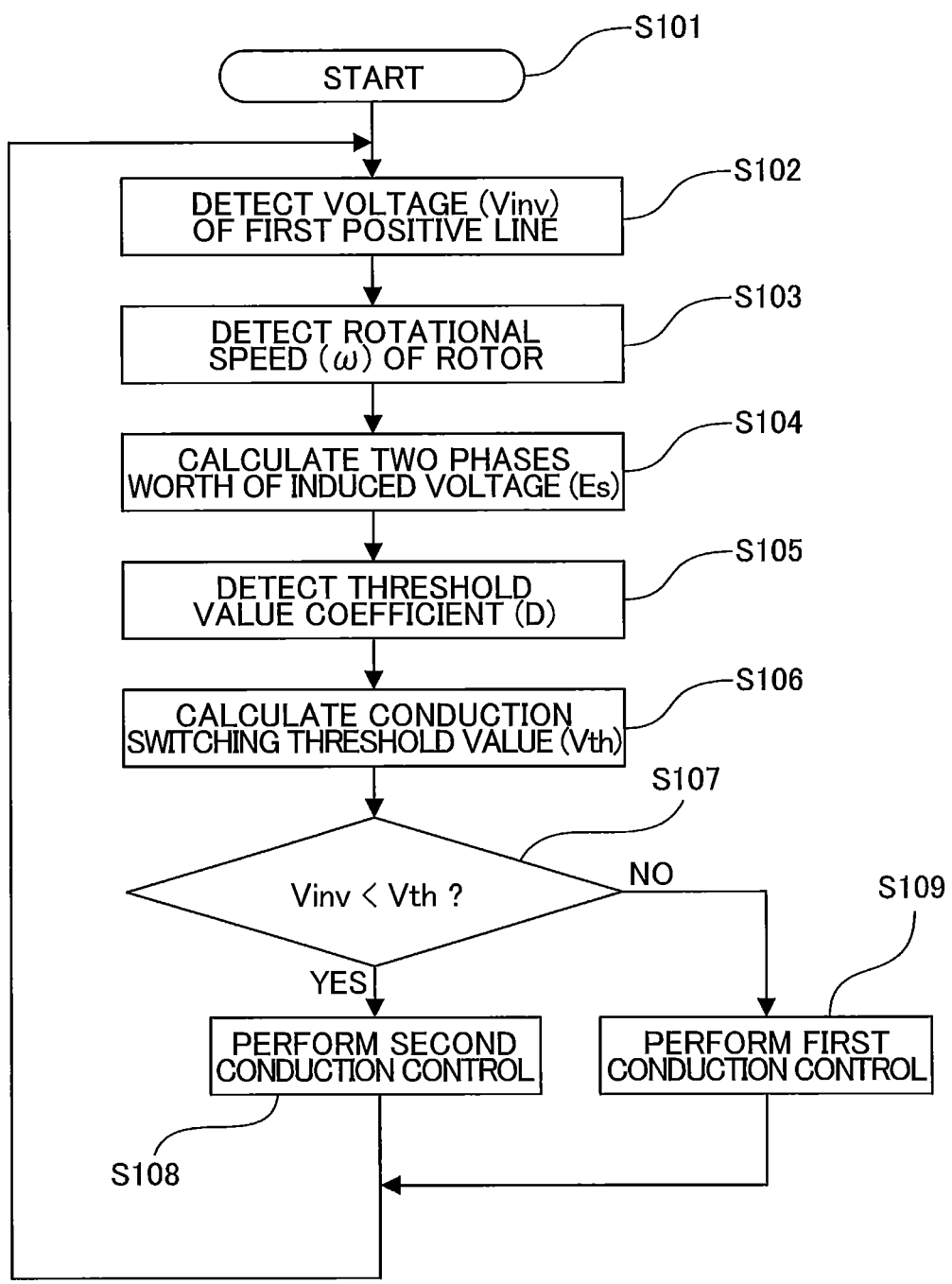
FIG. 13 is a flowchart illustrating motor drive control performed by a controller of the electric circular saw according to the first embodiment of the present invention.

13. FIG. 13 is a flowchart illustrating the drive control performed by the controller 54F.

As illustrated in FIG. 13, in 5101, when the user pulls the trigger switch 22A, the trigger switch 22A outputs a start signal and the controller 54F rotates the rotor 42 of the motor 4 at a duty ratio based on the signal specifying the target speed that is outputted from the rotational speed setting switch 21B. When the rotor 42 rotates, the rotational shaft 44 rotates together with the rotor 42. The rotational force of the rotational shaft 44 is transmitted to the saw blade 8 via the reduction mechanism (not illustrated) and the saw blade 8 rotates, thereby enabling a cutting operation to be performed.

When the rotor 42 is driven to rotate in S101, in S102 a voltage (Vinv) of the first positive line MC is detected. This detection is performed by the bus voltage detecting circuit 54B. After the voltage (Vinv) of the first positive line MC is detected in S102, in S103 the controller 54F calculates the rotational speed ($\omega$) of the rotor 42. The controller 54F performs this calculation on the basis of the rotated position information inputted from the rotated position detecting circuit 54D.

Next, in S104 the controller 54F calculates two phases worth of induced voltage (Es) generated in the three-phase windings of the motor 4. One phase worth of induced voltage generated in the three-phase windings can be obtained by multiplying the rotational speed ($\omega$) by the induced voltage constant (Ke) determined by the characteristics of the motor 4, and the induced voltage (Es) for two phases is calculated from the calculation results, i.e., the calculated one phase worth of induced voltage. After calculating the induced voltage in S104, in S105 the controller 54F calculates a threshold value coefficient (D). The threshold value coefficient (D) is used for setting the conduction switching threshold value. The threshold value coefficient (D) is set greater than 1 and smaller than the value obtained by dividing the maximum value of the DC pulsating voltage outputted from the voltage conversion circuit 51 by the induced voltage (Es) for two phases. The threshold value coefficient (D) is calculated on the basis of the magnitude of induced voltage, the time required to switch between the first conduction control and the second conduction control, and the like.

In S106 the conduction switching threshold value (Vth) is calculated. The controller 54F calculates the conduction switching threshold value (Vth) by multiplying the threshold value coefficient (D) by the induced voltage (Es) for two phases. After calculating the conduction switching threshold value (Vth) in S106, in S107 the controller 54F determines whether the voltage (Vinv) of the first positive line 51C is less than the conduction switching threshold value.

When the controller 54F determines that the voltage (Vinv) of the first positive line 51C is less than the conduction switching threshold value (S107: YES), in S108 the controller 54F executes the second conduction control. That is, if the controller 54F is already executing the second conduction control when advancing to S108, the controller 54F continues executing the second conduction control. However, if the controller 54F is executing the first conduction control when advancing to 5108, the controller 54F switches the conduction control from the first conduction control to the second conduction control. On the other hand, when the controller 54F determines that the voltage (Vin) of the first positive line 51C is not less than the conduction switching threshold value (S107: NO), in S109 the controller 54F executes the first conduction control. In other words, when already executing the first conduction control upon advancing to 5109, the controller 54F continues executing the first conduction control. However, if performing the second conduction control when advancing to 5109, the controller 54F switches the conduction control from the second conduction control to the first conduction control.

After executing conduction control in either S108 or S109, the controller 54F returns to S102 and repeats the above process until output of the start signal from the trigger switch 22A is halted.

Figure 14:
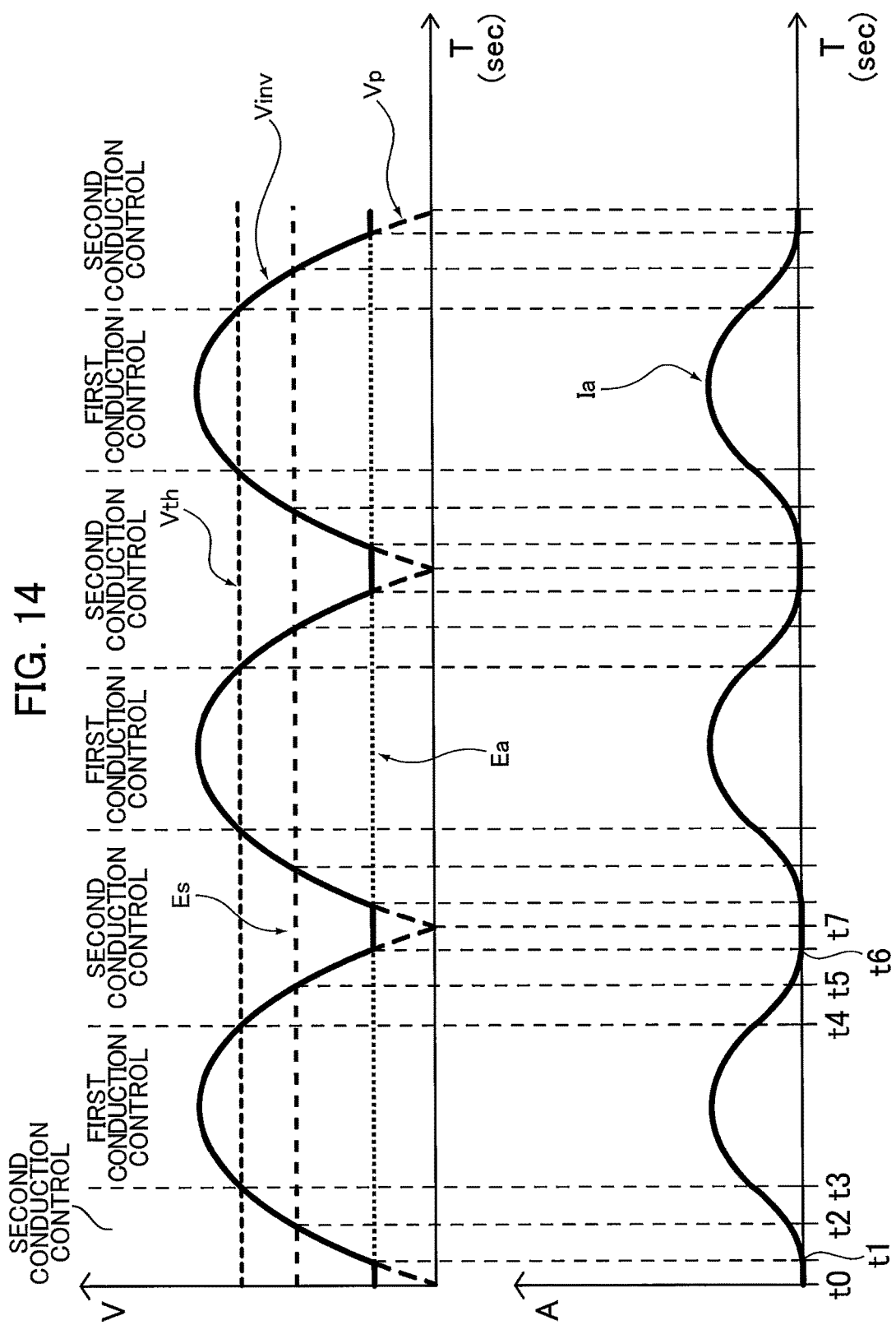
FIG. 14 is a diagram illustrating changes over time in voltage at the first positive line and current flowing through the motor when the controller of the electric circular saw according to the first embodiment of the present invention performs drive control.
Figure 15:
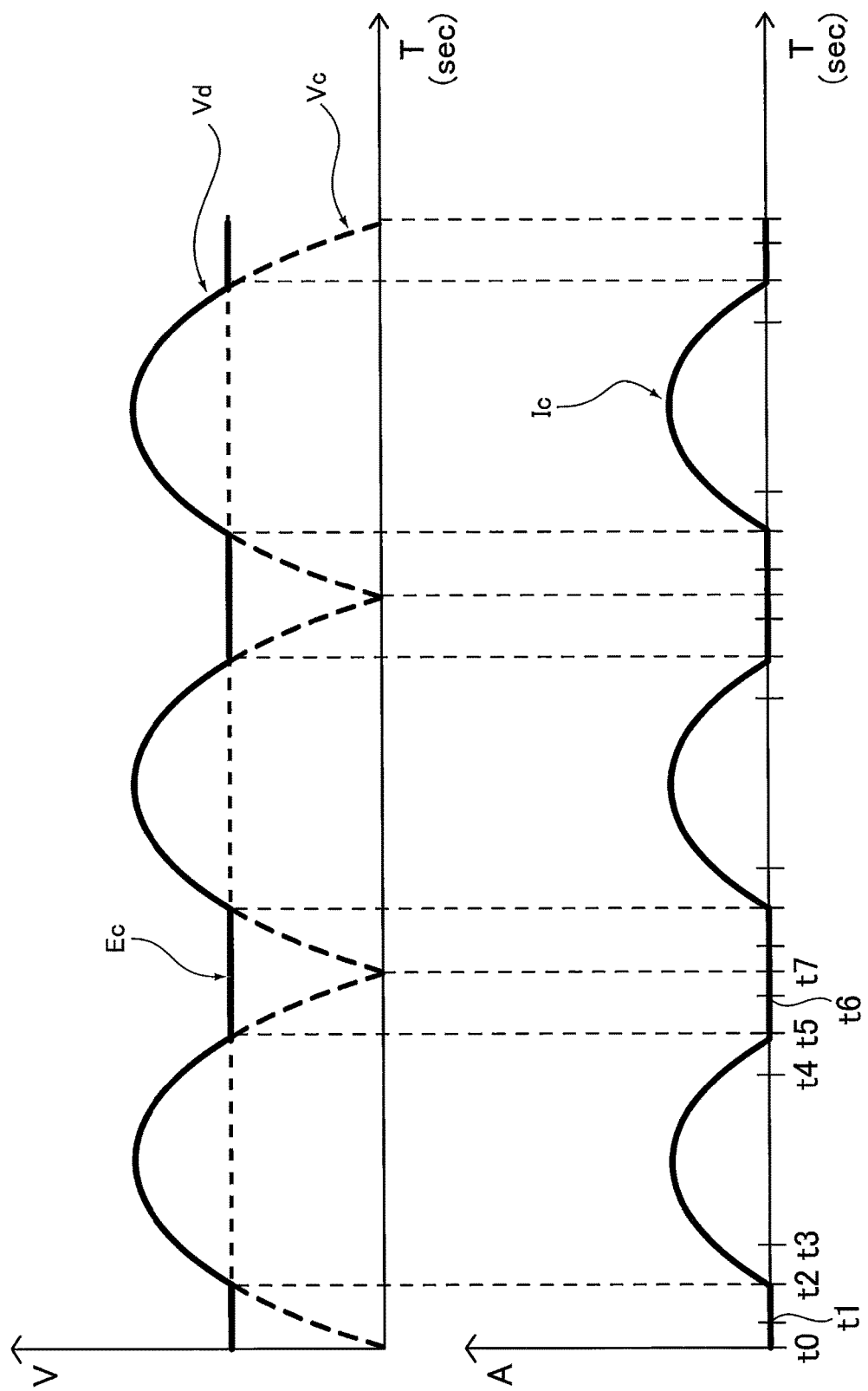
FIG. 15 is a diagram illustrating changes over time in bus voltage of an inverter circuit and current flowing through a motor when a conventional power tool performs drive control.

Next, changes over time in voltage at the first positive line 51C and current flowing through the motor 4 when the controller 54F performs drive control will be described and a comparison to drive control on a conventional power tool will be given while referring to FIGS. 14 and 15. FIG. 14 illustrates the changes over time in the voltage at the first positive line 51C and the current flowing through the motor 4 when the controller 54F performs drive control. FIG. 15 illustrates the changes over time in the bus voltage of an inverter circuit and current flowing through a motor when a conventional power tool performs drive control.

First, the case in which the controller 54F performs drive control will be described with reference to FIG. 14. In FIG. 14, Vp depicted with a dashed line denotes the DC pulsating voltage outputted from the voltage conversion circuit 51 that has a near-full-wave rectified waveform, Ea denotes the induced voltage for one phase of the conducting winding, Es denotes the induced voltage for two phases of the conducting windings, and Vth denotes the conduction switching threshold value. In addition, Vinv depicted as a solid line denotes the voltage at the first positive line 51C detected by the bus voltage detecting circuit 54B, while Ia denotes the motor current flowing through the motor 4. Note that the Ea and Es illustrated in FIG. 14 are merely examples.

As illustrated in FIG. 14, in the drive control performed by the controller 54F, the controller 54F executes the second conduction control during the period of time from time t0 to time t3 since the voltage Vinv at the first positive line 51C is less than the conduction switching threshold value Vth (corresponding to YES in S107). Accordingly, within this period of time, the motor current Ia does not flow between times t0 and t1 when the DC pulsating voltage Vp is less than or equal to the single-phase induced voltage Ea, but does flow between times t1 and t3 when the DC pulsating voltage Vp is higher than the single-phase induced voltage Ea. Note that time t2 marks the time at which the DC pulsating voltage Vp becomes higher than the double-phase induced voltage Es.

The controller 54F performs the first conduction control during the period of time from time t3 to time t4 since the voltage Vinv at the first positive line 51C is greater than or equal to the conduction switching threshold value Vth (corresponding to NO in S107). During this period of time, the motor current Ia continues to flow since the DC pulsating voltage Vp is higher than the double-phase induced voltage Es.

The controller 54F performs the second conduction control during the period of time from time t4 to time t7 since the voltage Vinv at the first positive line 51C is once again less than the conduction switching threshold value Vth (corresponding to YES in S107). Accordingly, during this period of time, the number of conducting windings is decreased and thus the winding inductance decreases. Further, within this period of time, the motor current Ia flows between times t4 and t6 when the DC pulsating voltage Vp is higher than the single-phase induced voltage Ea, but does not flow between times t6 and t7 when the DC pulsating voltage Vp is less than or equal to the single-phase induced voltage Ea. From time t7, the pattern for the period of time between times t0 and t7 is repeated. Note that time t5 marks the point that the DC pulsating voltage Vp becomes less than or equal to the double-phase induced voltage Es.

In this way, when the controller 54F of the electric circular saw 1 according to the present embodiment performs drive control, current flows through the motor 4 in the period of time between times t1 and t6 and does not flow through the motor 4 both in the period of time between times t0 and t1 and in the period of time between times t6 and t7. That is, the period of time during which torque is generated in the motor 4 is the period of time between times t1 and t6. In other words, within a period of time during which the varying voltage falls (for example, the period of time from the time of peak voltage between times t3 and t4 to time t7), the inductance of the conducting windings is decreased by switching from the first conduction control to the second conduction control (i.e., by reducing the number of conducting windings). On the other hand, within a period of time during which the varying voltage rises (for example, the period of time from time t7 to the next peak voltage), the inductance of the conducting windings is increased by switching from the second conduction control to the first conduction control (i.e., by increasing the number of conducting windings).

Next, the case in which the conventional power tool performs drive control will be described with reference to FIG. 15. Ec depicted by a dashed line in FIG. 15 has the same value as the double-phase induced voltage Es of the present embodiment and denotes the double-phase induced voltage of the conventional power tool. Vc depicted by a dashed line in FIG. 15 denotes the DC pulsating voltage in the conventional power tool and has the same waveform as the DC pulsating voltage Vp of the present embodiment. Further, Vd depicted by a solid line in FIG. 15 denotes the bus voltage of the inverter circuit in the conventional power tool, while Ic denotes the current flowing through the motor. Note that the times t0-t7 illustrated in FIG. 15 are equivalent to the times t0-t7 illustrated in FIG. 14.

As illustrated in FIG. 15, the conventional power tool performs only conduction control equivalent to the first conduction control of the present embodiment. That is, the conventional power tool does not switch the conduction control. Accordingly, in the conventional power tool, the number of conducting windings is not changed. In other words, throughout the entire period of the conduction control performed on the conventional power tool, the motor current Ic only flows when the DC pulsating voltage Vc is higher than the double-phase induced voltage Ec. Consequently, in the conventional power tool, the motor current Ic flows only for the period of time between times t2 and t5 during which the DC pulsating voltage Vc is higher than the double-phase induced voltage Ec, and torque is generated only during this period of time.

Thus, while drive control performed on the conventional power tool produces torque only during the period of time between times t2 and t5, drive control in the present embodiment produces torque during the period of time between times t1 and t6 that includes and is longer than this period of time between times t2 and t5. Stated differently, in the drive control performed by the electric circular saw 1 according the first embodiment of the present invention, the period of time during which torque is produced can be made longer than that in the drive control performed by the conventional power tool, thereby effectively suppressing torque ripple in the motor 4.

As described above, the electric circular saw 1 as an example of the power tool according to the first embodiment of the present invention is provided with the motor 4 having the stator 41 that includes star-connected three-phase windings (the U-phase winding 41U, the V-phase winding 41V, and the W-phase winding 41W), and the rotor 42 that is rotatable relative to the stator 41; the voltage conversion circuit 51 that converts AC voltage supplied from the commercial AC power supply P to DC pulsating voltage; the bus voltage detecting circuit 54B that detects the DC pulsating voltage; the inverter circuit 52, bridge circuit 53, and controller 54F that possess the second positive line 52A and second negative line 52B for applying DC pulsating voltage to the star-connected three-phase windings and that switch at least one conducting winding to be applied with the DC pulsating voltage among the three-phase windings in order to rotate the rotor 42; and the rotated position detecting circuit 54D and controller 54F that calculate induced voltage generated in the three windings by the rotation of the rotor 42. The electric circular saw 1 changes the number of conducting windings from two to one on the basis of the DC pulsating voltage and the induced voltage.

In the above configuration, the number of conducting windings can be changed. Accordingly, the electric circular saw 1 can change the combined voltage of induced voltages produced in the conducting windings. That is, the electric circular saw 1 can change the combined voltage applied across the second positive line 52A and the second negative line 52B. Thus, the electric circular saw 1 can lengthen the period during which the DC pulsating voltage is higher than the combined induced voltage and electric current flows through the motor 4, i.e., the period in which torque is generated, thereby suppressing torque ripple. Further, since the electric circular saw 1 having the above construction modifies the combination of induced voltage by changing the number of conducting windings, the electric circular saw 1 can reduce power consumption and suppress demagnetization of the permanent magnets in the rotor better than a structure that modifies the induced voltage through field-weakening control or the like in which current is supplied for weakening the magnetic field.

Further, since the electric circular saw 1 sets the number of conducting windings to one when the DC pulsating voltage is less than the conduction switching threshold value, the electric circular saw 1 can set the combined induced voltage generated in the conducting windings lower than that when two conducting windings are used. Accordingly, current can be supplied to the motor 4 even when the DC pulsating voltage is lower than the combination of induced voltages generated in two conducting windings, thereby lengthening the period of time during which current flows through the motor 4. In this way, the electric circular saw 1 can suppress torque ripple. Further, since the conduction switching threshold value is higher than the combined induced voltage in two conducting windings, the electric circular saw 1 can reliably change the number of conducting windings from two to one before the DC pulsating voltage drops below the combined induced voltage in the two conducting windings, thereby reliably suppressing torque ripple.

From another perspective, since the electric circular saw 1 modifies the maximum series number of conducting windings connected in series between the second positive line 52A and the second negative line 52B on the basis of the DC pulsating voltage and the induced voltage, the electric circular saw 1 can modify the combination of induced voltage in the conducting windings that is applied across the second positive line 52A and the second negative line 52B. In this way, the electric circular saw 1 can lengthen the period during which the DC pulsating voltage is higher than the combination of induced voltage and electric current flows through the motor 4, i.e., the period during which torque is generated, thereby suppressing torque ripple.

Further, since the electric circular saw 1 sets the maximum series number to one (no series connection) when the DC pulsating voltage is less than the conduction switching threshold value, the electric circular saw 1 can set the combination of induced voltage generated in the conducting windings lower than that when the maximum series number is two. Hence, the electric circular saw 1 can supply current to the motor 4 even when the DC pulsating voltage is lower than the combination of induced voltages in the conducting windings during times that the maximum series number of conducting windings is two, thereby lengthening the period during which current flows through the motor 4. Accordingly, the electric circular saw 1 can suppress torque ripple.

The electric circular saw 1 has three-phase windings in a star-connection and also includes the bridge circuit 53 that connects the neutral point 4A to the second positive line 52A and second negative line 52B. The electric circular saw 1 sets the number of conducting windings to one and the maximum series number to one by applying voltage to the three-phase windings via the bridge circuit 53. Hence, through a simple construction for applying voltage to the three-phase windings via the bridge circuit 53, the electric circular saw 1 can change the number of conducting windings and the maximum series number between two and one.

Figure 16:
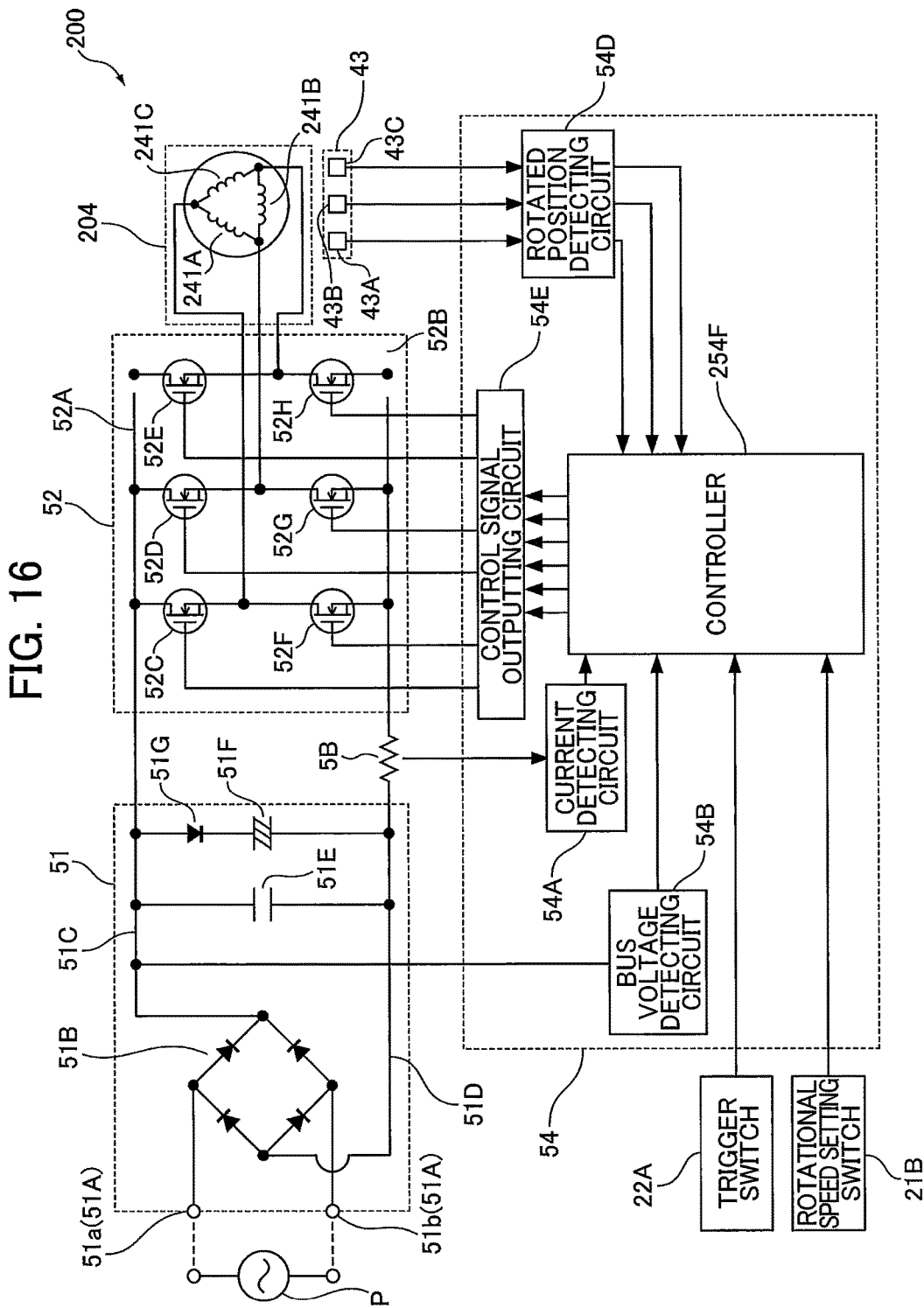
FIG. 16 is a circuit diagram that includes a block diagram and illustrates electrical structures of a motor and a control circuit section in an electric circular saw according to a second embodiment of the present invention.

Next, an electric circular saw 200 as an example of a power tool according to a second embodiment of the present invention will be described with reference to FIGS. 16 through 22, wherein structures and components similar to those in the electric circular saw 1 according to the first embodiment are designated with the same reference numerals to avoid duplicating description. The following description will focus on structures, components, and control that differ from those of the electric circular saw 1 in the first embodiment. FIG. 16 is a circuit diagram that includes a block diagram illustrating the electrical structures of a motor 204 and the control circuit section 54 in the electric circular saw 200.

As illustrated in FIG. 16, the electric circular saw 200 is provided with a motor 204, and a controller 254F. The electric circular saw 200 does not include the bridge circuit 53 and the gate driving circuit 54C provided in the electric circular saw 1. Thus, the electric circular saw 200 differs from the electric circular saw 1 in the inclusion of the motor 204 and the controller 254F and the exclusion of the bridge circuit 53, but the remaining structures and components are identical.

The motor 204 includes delta-connected three-phase windings, namely, a UV-phase winding 241A, a VW-phase winding 241B, and a WU-phase winding 241C. The UV-phase winding 241A, VW-phase winding 241B, and WU-phase winding 241C are respectively wound about the teeth 41C and 41F, the teeth 41D and 41G, and the teeth 41B and 41E. The motor 204 differs from the motor 4 in the electric circular saw 1 in that the three-phase windings have a delta connection, but the remaining structure and components are identical. The UV-phase winding 241A, the VW-phase winding 241B, and the WU-phase winding 241C are an example of the "plurality of windings" in the present invention.

The controller 254F performs drive control for the motor 204 while switching the conduction control between third conduction control and fourth conduction control. The controller 254F differs from the controller 54F of the electric circular saw 1 in that the conduction control is switched between the third conduction control and the fourth conduction control, but the remaining structure, components, and control are identical to those in the first embodiment. Specifically, in the drive control illustrated in the flowchart of FIG. 13, the controller 254F executes the fourth conduction control in place of the second conduction control in S108 and executes the third conduction control in place of the first conduction control in S109. The remaining steps in the process of FIG. 13 are identical to those performed by the electric circular saw 1. Accordingly, a detailed description of drive control performed by the controller 254F of the electric circular saw 200 according to the second embodiment will be omitted.

The controller 254F uses, as the conduction control, the third conduction control and the fourth conduction control. The controller 254F switches the conduction control between the third conduction control and the fourth conduction control on the basis of the voltage at the first positive line 51C indicated by the bus voltage signal outputted from the bus voltage detecting circuit 54B and the calculated induced voltage.

Figure 17:
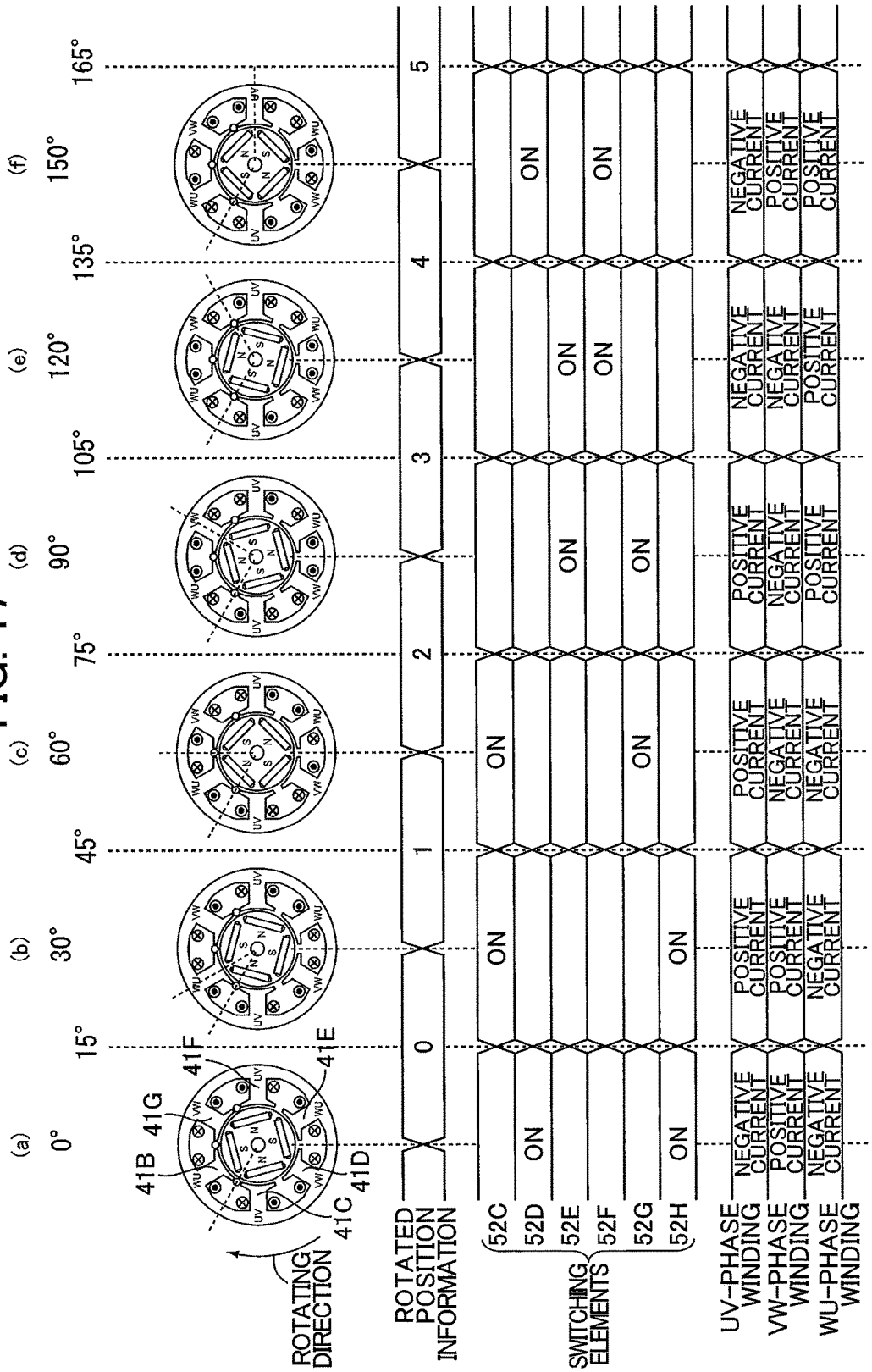
FIG. 17 is a diagram illustrating relationships among rotated position information, conducting windings, and switching elements set to their ON states during third conduction control performed by the electric circular saw according to the second embodiment of the present invention.
Figure 19:
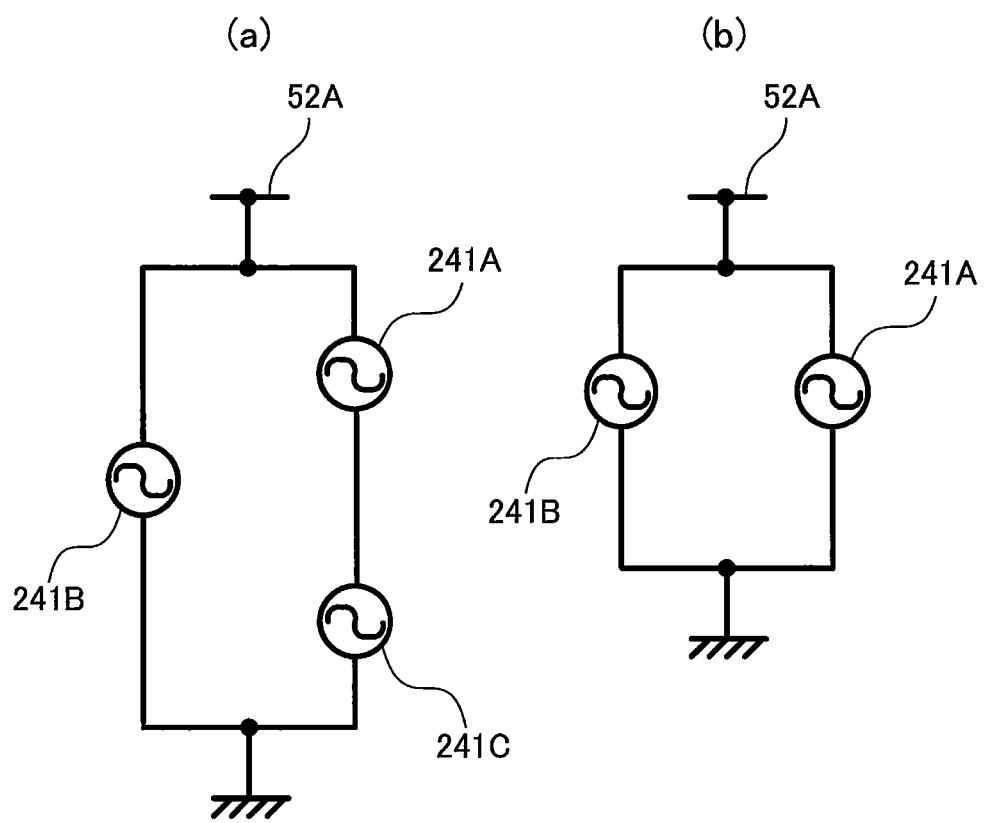
FIG. 19 is a circuit diagram illustrating equivalent circuits of the motor when the conducting windings of the electric circular saw according to the second embodiment of the present invention are treated as power sources.

Here, the third conduction control will be described with reference to FIGS. 17 through 19. FIG. 17 illustrates the relationships among the rotated position information, conducting windings, and switching elements set to their ON states during the third conduction control when the rotated position of the rotor 42 is (a) 0°, (b) 30°, (c) 60°, (d) 90°, (e) 120°, and (f) 150°. FIG. 18 illustrates the conducting direction in which current flows through the conducting windings during third conduction control when the rotated position is (a) between 15° and 45° and (b) between 105° and 135°. FIG. 19 illustrates equivalent circuits of the motor 204 when the conducting windings are treated as power sources while (a) performing the third conduction control and (b) performing the fourth conduction control.

In the third conduction control, the controller 254F rotates the rotor 42 in a prescribed rotating direction (clockwise in FIG. 17) by switching the six switching elements 52C-52H of the inverter circuit 52 on and off. Further, in the third conduction control, all three-phase windings are connected between the second positive line 52A and the second negative line 52B as conducting windings at all times, and the controller 254F rotates the rotor 42 in the prescribed rotating direction by switching these conducting windings based on the rotated position information. In the third conduction control, two of the three phases are always connected in series between the second positive line 52A and the second negative line 52B, while the remaining phase is connected in parallel to the series-connected two phases. In other words, the number of conducting windings (the number of conducting phases) is always three in the third conduction control, while the maximum number of windings connected in series between the second positive line 52A and the second negative line 52B (the maximum series number) is two. Therefore, when the conducting windings that produce induced voltage are treated as power sources, the equivalent circuit of the motor 204 during the third conduction control has two power sources connected in series and a single power source connected in parallel to the series-connected two power sources. Consequently, in the third conduction control, current flows through the motor 204 only for a period of time during which the DC pulsating voltage is higher than the combined voltage of induced voltages generated in two phases (two phases worth of induced voltage). The number 3 denoting the number of conducting windings in the third conduction control is an example of the "first conduction number" in the present invention, and the number 2 denoting the maximum series number in the third conduction control is an example of the "first series number" in the present invention.

As illustrated in FIGS. 17(a)-(f), in the third conduction control, the rotated position information outputted from the rotated position detecting circuit 54D in accordance with the rotated position of the rotor 42 is identical to that during the first conduction control and the second conduction control on the electric circular saw 1. However, the drive signals outputted by the controller 254F in accordance with the rotated position information, the switching elements set to their ON states, and the conducting windings differ from those in the first conduction control and the second conduction control performed by the controller 54F. Specifically, in the first conduction control performed on the electric circular saw 1, the controller 54F switches the drive signals in synchronization with the rotated position information that changes each time the rotated position changes by 30°. However, in the third conduction control performed on the electric circular saw 200, the controller 254F switches the drive signals, switching elements set to their ON states, and conducting windings at timings shifted by 15° of the rotated position rather than in synchronization with the rotated position information. That is, while the rotated position information changes at the rotated positions of 0°, 30°, 60°, 90°, 120°, and 150°, the drive signal outputted by the controller 254F changes at the rotated positions of 15°, 45°, 75°, 105°, 135°, and 165°.

In the third conduction control, between the rotated positions of 15° and 45° illustrated in FIG. 17(b), i.e., between the rotated positions of 15° and 30° during which the rotated position detecting circuit 54D outputs "0" as the rotated position information and between the rotated positions of 30° and 45° during which the rotated position detecting circuit 54D outputs "1" as the rotated position information, the controller 254F outputs drive signals to the control signal outputting circuit 54E for setting the switching elements 52C and 52H of the inverter circuit 52 to their ON states.

When the switching elements 52C and 52H are brought into their ON states, as illustrated in FIG. 18(a), the UV-phase winding 241A and the VW-phase winding 241B are connected in series between the second positive line 52A and the second negative line 52B and the WU-phase winding 241C is connected in parallel to the series-connected UV-phase winding 241A and VW-phase winding 241B. In this connected state, current flows counterclockwise through the UV-phase winding 241A and the VW-phase winding 241B, as indicated by arrow L in FIG. 18(a) and current flows clockwise through the WU-phase winding 241C, as indicated by arrow M in FIG. 18(a). In the following description current flowing counterclockwise in FIG. 18 as indicated by arrow L will be called "positive current" while current flowing clockwise as indicated by arrow M will be called "negative current" for convenience.

When positive current flows through the UV-phase winding 241A and the VW-phase winding 241B and negative current flows through the WU-phase winding 241C, the teeth 41C and 41F about which the UV-phase winding 241A is wound and the teeth 41D and 41G about which the VW-phase winding 241B is wound become N poles, and the teeth 41B and 41E about which the WU-phase winding 241C is wound become S poles. Between the rotated positions of 15° and 45° illustrated in FIG. 17(b), the teeth 41C and 41F functioning as N poles face the N poles in the rotor 42 at their downstream side parts in the rotating direction, the teeth 41D and 41G functioning as N poles face the S poles in the rotor 42 at their upstream side parts in the rotating direction, and the teeth 41B and 41E functioning as S poles respectively face an S pole in the rotor 42 at its downstream side part in the rotating direction and an N pole in the rotor 42 at its upstream side part in the rotating direction. Consequently, forces of repulsion act between the teeth 41C and 41F and the N poles of the rotor 42, forces of attraction act between the teeth 41D and 41G and the S poles of the rotor 42, and forces of repulsion and attraction act between the teeth 41B and 41E and the corresponding S pole and N pole of the rotor 42. These forces of repulsion and attraction produce torque for rotating the rotor 42 in the prescribed rotating direction.

As illustrated in FIG. 17(c), between the rotated positions of 45° and 75°, the controller 254F outputs drive signals to the control signal outputting circuit 54E for setting the switching elements 52C and 52G of the inverter circuit 52 to their ON states.

When the switching elements 52C and 52G are brought into their ON states, the VW-phase winding 241B and the WU-phase winding 241C are connected in series between the second positive line 52A and the second negative line 52B, the UV-phase winding 241A is connected in parallel, positive current flows through the UV-phase winding 241A, and negative current flows through the VW-phase winding 241B and the WU-phase winding 241C. During this period, the teeth 41C and 41F about which the UV-phase winding 241A is wound form N poles, the teeth 41D and 41G about which the VW-phase winding 241B is wound form S poles, and the teeth 41B and 41E about which the WU-phase winding 241C is wound form S poles, thereby producing torque.

As illustrated in FIG. 17(d), between the rotated positions of 75° and 105°, the controller 254F sets the switching elements 52E and 52G to their ON states. During this period, the UV-phase winding 241A and the WU-phase winding 241C are connected in series between the second positive line 52A and the second negative line 52B, the VW-phase winding 241B is connected in parallel, positive current flows through the UV-phase winding 241A and the WU-phase winding 241C, and negative current flows through the VW-phase winding 241B. Also, during this period, the teeth 41C and 41F about which the UV-phase winding 241A is wound form N poles, the teeth 41D and 41G about which the VW-phase winding 241B is wound form S poles, and the teeth 41B and 41E about which the WU-phase winding 241C is wound form N poles, thereby producing torque.

As illustrated in FIG. 17(e), between the rotated positions of 105° and 135°, the controller 254F sets the switching elements 52E and 52F to their ON states. As illustrated in FIG. 18(b), in this period, the UV-phase winding 241A and the VW-phase winding 241B are connected in series between the second positive line 52A and the second negative line 52B, the WU-phase winding 241C is connected in parallel, negative current (arrow M) flows through the UV-phase winding 241A and the VW-phase winding 241B, and positive current (arrow L) flows through the WU-phase winding 241C. Also, during this period, the teeth 41C and 41F about which the UV-phase winding 241A is wound form S poles, the teeth 41D and 41G about which the VW-phase winding 241B is wound form S poles, and the teeth 41B and 41E about which the WU-phase winding 241C is wound form N poles, thereby producing torque.

As illustrated in FIG. 17(f), between the rotated positions 135° and 165°, the controller 254F sets the switching elements 52D and 52F to their ON states. During this period, the VW-phase winding 241B and the WU-phase winding 241C are connected in series between the second positive line 52A and the second negative line 52B, the UV-phase winding 241A is connected in parallel, positive current flows through the VW-phase winding 241B and the WU-phase winding 241C, and negative current flows through the UV-phase winding 241A. Also, during this period, the teeth 41C and 41F about which the UV-phase winding 241A is wound form S poles, the teeth 41D and 41G about which the VW-phase winding 241B is wound form N poles, and the teeth 41B and 41E about which the WU-phase winding 241C is wound form N poles, thereby producing torque.

As in the first conduction control and the second conduction control performed on the electric circular saw 1, the switching pattern of rotated position information and drive signals in the third conduction control is repeated each time the rotated position of the rotor 42 changes by 180°. Accordingly, the period of time between the rotated positions 165° and 180° and the period of time between the rotated positions 0° and 15° can be combined to describe the period of time between the rotated positions 165° and 195°.

As illustrated in FIG. 17(a), during the period of time between the rotated positions 165° and 195°, the controller 254F sets the switching elements 52D and 52H to their ON states. During this period, the UV-phase winding 241A and the WU-phase winding 241C are connected in series between the second positive line 52A and the second negative line 52B, the VW-phase winding 241B is connected in parallel, negative current flows through the UV-phase winding 241A and the WU-phase winding 241C, and positive current flows through the VW-phase winding 241B. Also, during this period, the teeth 41C and 41F about which the UV-phase winding 241A is wound form S poles, the teeth 41D and 41G about which the VW-phase winding 241B is wound form N poles, and the teeth 41B and 41E about which the WU-phase winding 241C is wound form S poles, thereby producing torque.

Here, note the continuous periods of ON and OFF states of a single switching element in the third conduction control described above. For example, the ON state of the switching element 52C is continued between the rotated positions 15° and 75° (when the rotor 42 rotates 60°). In the meantime, in respect of other switching elements, for example, the ON state of the switching element 52F is continued between the rotated positions 45° and 105° (while the rotor 42 rotates 60°). In this way, in the third conduction control, the ON states of all of the six switching elements are continued for a period of time during which the rotor 42 rotates 60°, but at different timings. In other words, in the third conduction control, the controller 254F controls electrical conduction according to a 120° conduction method in which the ON states of all of the six switching elements are continued during an electrical angle of 120°.

Figure 20:
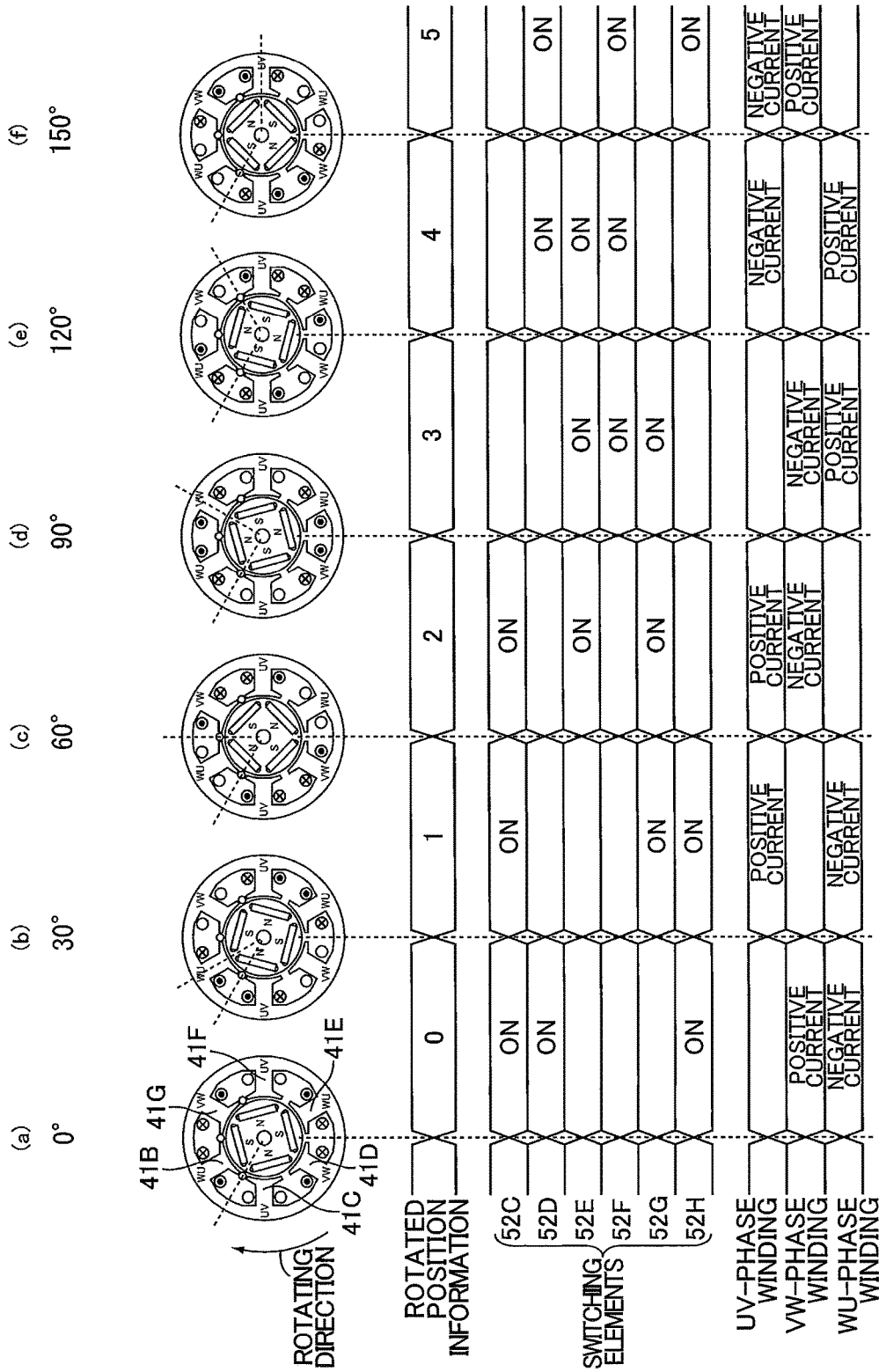
FIG. 20 is a diagram illustrating relationships among the rotated position information, conducting windings, and switching elements set to their ON states during the fourth conduction control performed by the electric circular saw according to the second embodiment of the present invention.
Figure 21:
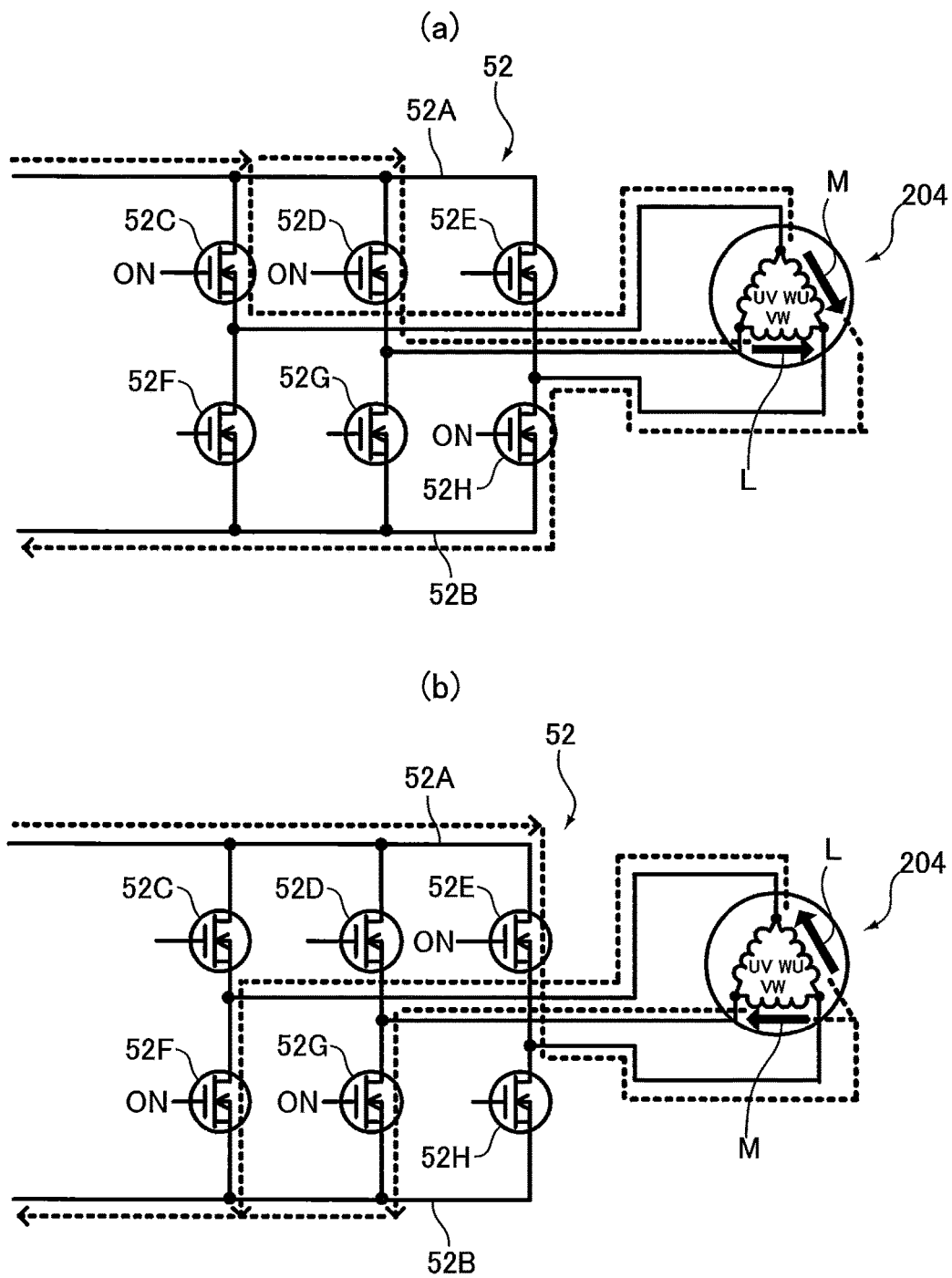
FIG. 21 is a diagram illustrating a conducting direction in which current flows through the conducting windings during the fourth conduction control performed by the electric circular saw according to the second embodiment of the present invention.

Next, the fourth conduction control will be described with reference to FIGS. 19-21. FIG. 20 illustrates the relationships among the rotated position information, conducting windings, and switching elements set to their ON states during the fourth conduction control when the rotated position of the rotor 42 is (a) 0°, (b) 30°, (c) 60°, (d) 90°, (e) 120°, and (f) 150°. FIG. 21 illustrates the conduction direction in which current flows through the conducting windings during the fourth conduction control when the rotated position is (a) between 0° and 30° and (b) between 90° and 120°.

In the fourth conduction control, the controller 254F rotates the rotor 42 in a prescribed rotating direction (clockwise in FIG. 20) by switching the six switching elements 52C-52H of the inverter circuit 52 on and off. In the fourth conduction control, two of the three-phase windings are connected in parallel between the second positive line 52A and the second negative line 52B at all times and function as conducting windings, and the controller 254F rotates the rotor 42 in the prescribed rotating direction by switching conducting windings on the basis of the rotated position information. In the fourth conduction control, only two of the three phases are connected in parallel between the second positive line 52A and the second negative line 52B. That is, the number of conducting windings (the number of conducting phases) is always two in the fourth conduction control, and the maximum number of windings connected in series between the second positive line 52A and the second negative line 52B (the maximum series number) is one. Therefore, when the conducting windings that generate induced voltage are treated as power sources, an equivalent circuit of the motor 204 in the fourth conduction control has only two power sources connected in parallel to each other, as illustrated in FIG. 19(b). Accordingly, in the fourth conduction control, current flows through the motor 204 only during periods in which the DC pulsating voltage is higher than the induced voltage generated in one phase. One phase worth of induced voltage is approximately half two phases worth of induced voltage connected in series in the third conduction control. The number 2 denoting the number of conducting windings in the fourth conduction control is an example of the "second conduction number" in the present invention, and the number 1 denoting the maximum series number in the fourth conduction control is an example of the "second series number" in the present invention.

As illustrated in FIGS. 20(a)-(f), in the fourth conduction control, the rotated position information outputted from the rotated position detecting circuit 54D on the basis of the rotated position of the rotor 42 is identical to that in the first conduction control, but the drive signals outputted from the controller 254F on the basis of the rotated position information, switching elements set to their ON states, and conducting windings differ from that in the first conduction control.

As illustrated in FIG. 20(a), between the rotated positions 0° and 30°, the controller 254F outputs drive signals to the control signal outputting circuit 54E for setting the switching elements 52C, 52D, and 52H of the inverter circuit 52 to their ON states in order to rotate the rotor 42 in the prescribed rotating direction (clockwise in FIG. 20).

When the switching elements 52C, 52D, and 52H are brought into their ON states, the VW-phase winding 241B and the WU-phase winding 241C are connected in parallel between the second positive line 52A and the second negative line 52B, as illustrated in FIG. 21(a). In this connection state, positive current (arrow L) flows through the VW-phase winding 241B, and negative current (arrow M) flows through the WU-phase winding 241C.

When positive current flows through the VW-phase winding 241B and negative current flows through the WU-phase winding 241C, the teeth 41D and 41G about which the VW-phase winding 241B is wound form N poles, and the teeth 41B and 41E about which the WU-phase winding 241C is wound form S poles. As illustrated in FIG. 20(a), between the rotated positions 0° and 30°, the teeth 41D and 41G functioning as N poles face the S poles in the rotor 42 at their upstream side parts in the rotating direction and the teeth 41B and 41E functioning as S poles face the S poles in the rotor 42 at their downstream side parts in the rotating direction. Consequently, forces of attraction act between the teeth 41D and 41G and the S poles of the rotor 42, and forces of repulsion act between the teeth 41B and 41E and the S poles of the rotor 42. These forces of attraction and repulsion produce torque that rotates the rotor 42 in the prescribed rotating direction.

As illustrated in FIG. 20(*b*), between the rotated positions 30° and 60°, the controller 254F outputs drive signals to the control signal outputting circuit 54E for setting the switching elements 52C, 52G, and 52H of the inverter circuit 52 to their ON states.

When the switching elements 52C, 52G, and 52H are brought into their ON states, the UV-phase winding 241A and the WU-phase winding 241C are connected in parallel between the second positive line 52A and the second negative line 52B, positive current flows through the UV-phase winding 241A, and negative current flows through the WU-phase winding 241C. During this period, the teeth 41C and 41F about which the UV-phase winding 241A is wound form N poles, and the teeth 41B and 41E about which the WU-phase winding 241C is wound form S poles, thereby producing torque.

As illustrated in FIG. 20(*c*), between the rotated positions 60° and 90°, the controller 254F sets the switching elements 52C, 52E, and 52G to their ON states. During this period, the UV-phase winding 241A and the VW-phase winding 241B are connected in parallel between the second positive line 52A and the second negative line 52B, positive current flows through the UV-phase winding 241A, and negative current flows through the VW-phase winding 241B. Also, during this period, the teeth 41C and 41F about which the UV-phase winding 241A is wound form N poles and the teeth 41D and 41G about which the VW-phase winding 241B is wound form S poles, thereby producing torque.

As illustrated in FIG. 20(*d*), between the rotated positions 90° and 120°, the controller 254F sets the switching elements 52E, 52F, and 52G to their ON states. As illustrated in FIG. 21(*b*), during this period, the VW-phase winding 241B and the WU-phase winding 241C are connected in parallel between the second positive line 52A and the second negative line 52B, negative current (arrow M) flows through the VW-phase winding 241B, and positive current (arrow L) flows through the WU-phase winding 241C. Also, during this period, the teeth 41D and 41G about which the VW-phase winding 241B is wound form S poles and the teeth 41B and 41E about which the WU-phase winding 241C is wound form N poles, thereby producing torque.

As illustrated in FIG. 20(*e*), between the rotated positions 120° and 150°, the controller 254F sets the switching elements 52D, 52E, and 52F to their ON states. During this period, the UV-phase winding 241A and the WU-phase winding 241C are connected in parallel between the second positive line 52A and the second negative line 52B, negative current flows through the UV-phase winding 241A, and positive current flows through the WU-phase winding 241C. Also, during this period, the teeth 41C and 41F about which the UV-phase winding 241A is wound form S poles and the teeth 41B and 41E about which the WU-phase winding 241C is wound form N poles, thereby producing torque.

As illustrated in FIG. 20(*f*), between the rotated positions 150° and 180°, the controller 254F sets the switching elements 52D, 52F and 52H to their ON states. During this period, the UV-phase winding 241A and the VW-phase winding 241B are connected in parallel between the second positive line 52A and the second negative line 52B, negative current flows through the UV-phase winding 241A, and positive current flows through the VW-phase winding 241B. Also, during this period, the teeth 41C and 41F about which the UV-phase winding 241A is wound form S poles and the teeth 41D and 41G about which the VW-phase winding 241B is wound form N poles, thereby producing torque.

Here, note the continuous periods of ON and OFF states of a single switching element during the fourth conduction control described above. For example, the ON state of the switching element 52C is continued between the rotated positions of 0° and 90° (while the rotor 42 rotates 90°). In the meantime, in respect of other switching elements, for example, the ON state of the switching element 52G is continued between the rotated positions of 30° and 120° (while the rotor 42 rotates 90°). In this way, in the fourth conduction control, the ON states of all of the six switching elements are continued for a period of time during which the rotor 42 rotates 90°, but at a different timing from each other. In other words, in fourth conduction control, the controller 254F controls electrical conduction according to a 180° conduction method in which the ON states of all of the six switching elements are continued during an electrical angle of 180°.

Figure 22:
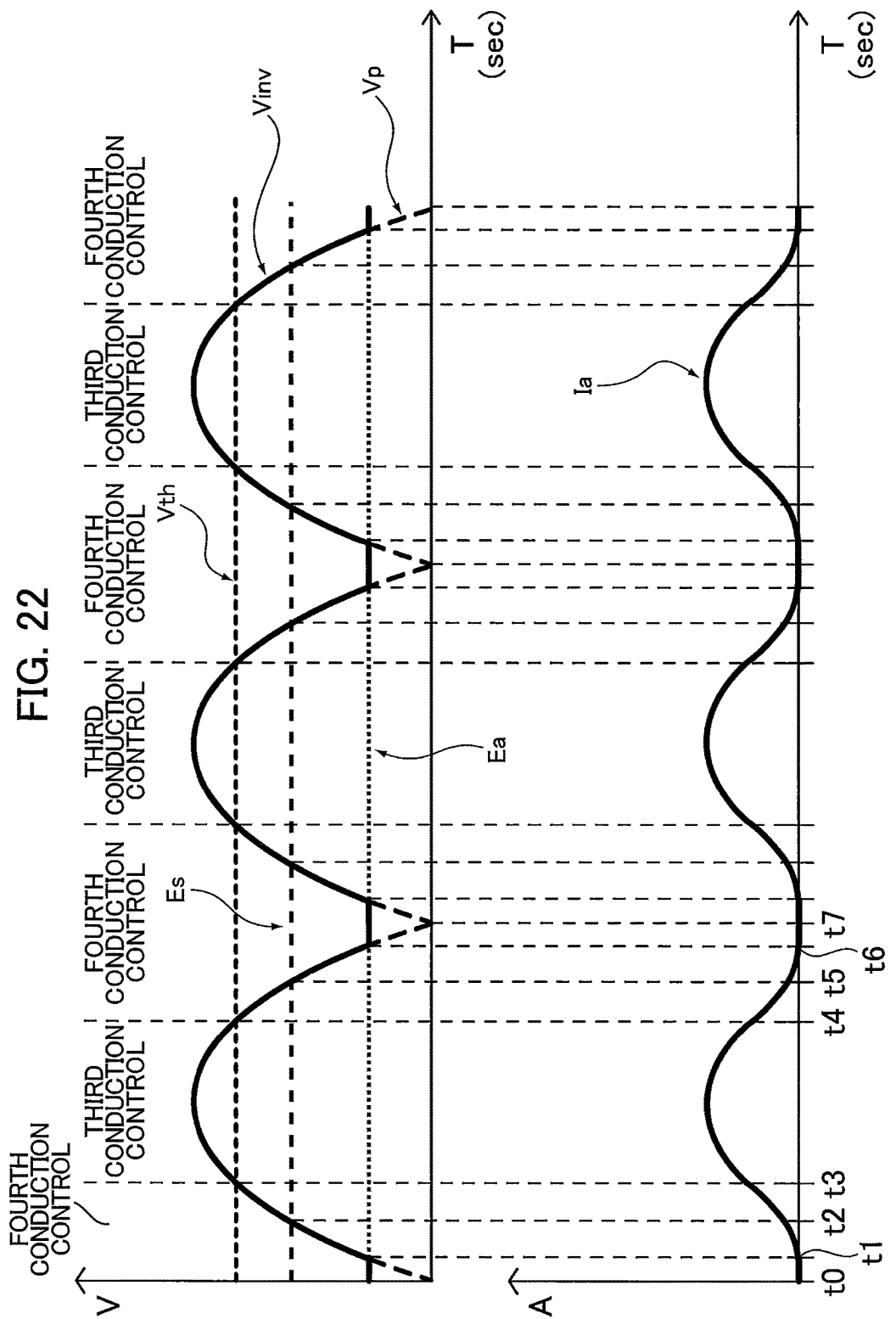
FIG. 22 is a diagram illustrating changes over time in voltage at the first positive line and current flowing through the motor when the controller of the electric circular saw according to the second embodiment of the present invention performs drive control.

Next, the changes over time in voltage at the first positive line 51C and current flowing through the motor 204 when the controller 254F performs drive control will be described with reference to FIG. 22. FIG. 22 illustrates the changes over time in voltage at the first positive line 51C and current flowing through the motor 204 when the controller 254F performs drive control.

Vp depicted by a dashed line in FIG. 22 denotes the DC pulsating voltage outputted from the voltage conversion circuit 51 that has a near-full-wave rectified waveform, Ea denotes the induced voltage for one phase worth of conducting windings, Es denotes the induced voltage for two phases worth of conducting windings, and Vth denotes the conduction switching threshold value. Further, Vinv depicted by a solid line in FIG. 22 denotes the voltage at the first positive line 51C detected by the bus voltage detecting circuit 54B, and Ia denotes motor current flowing through the motor 204. Note that the Ea and Es illustrated in FIG. 22 are merely examples.

As illustrated in FIG. 22, when performing drive control, the controller 254F executes the fourth conduction control during the period between times t0 and t3 since the voltage Vinv of the first positive line 51C is less than the conduction switching threshold value Vth (corresponding to YES in S107). During this period, the motor current Ia does not flow between times t0 and t1 when the DC pulsating voltage Vp is less than or equal to the single-phase induced voltage Ea, but does flow between times t1 and t3 when the DC pulsating voltage Vp is higher than the single-phase induced voltage Ea. Note that time t2 marks the point at which the DC pulsating voltage Vp becomes higher than the double-phase induced voltage Es.

The controller 254F performs the third conduction control in the period between times t3 and t4 since the voltage Vinv at the first positive line 51C is greater than or equal to the conduction switching threshold value Vth (corresponding to NO in S107). During this period, the motor current Ia continues to flow since the DC pulsating voltage Vp is higher than the double-phase induced voltage Es.

The controller 254F performs the fourth conduction control during the period between times t4 and t7 since the voltage Vinv at the first positive line 51C is once again less than the conduction switching threshold value Vth (corresponding to YES in S107). During this period the motor current Ia flows between times t4 and t6 when the DC pulsating voltage Vp is higher than the single-phase induced voltage Ea, but stops flowing between times t6 and t7 when the DC pulsating voltage Vp becomes less than or equal to the single-phase induced voltage Ea. From time t7, times t0-t7 described above are repeated. Note that time t5 marks the point that the DC pulsating voltage Vp becomes less than or equal to the double-phase induced voltage Es.

As described above, in the drive control performed by the controller 254F of the electric circular saw 200 according to the present embodiment, current flows through the motor 204 in the period between times t1 and t6 but does not flow through the motor 204 in the periods between times t0 and t1 and times t6 and t7. In other words, the period during which torque is generated in the motor 204 is the period between times t1 and t6.

A conventional power tool only performs conduction control corresponding to the third conduction control and does not switch conduction control. Thus, in the conventional power tool, the number of conducting windings is not changed. Hence, throughout the entire period of conduction control performed by the conventional power tool, current flows through the motor only when the DC pulsating voltage is higher than the double-phase induced voltage Ec. Consequently, on the conventional power tool, current flows through the motor and produces torque only during the period between times t2 and t5 when the DC pulsating voltage is higher than the double-phase induced voltage.

Thus, while drive control performed by the conventional power tool produces torque only during the period between times t2 and t5, drive control according to the present embodiment produces torque in the period between times t1 and t6, which includes and is longer than the period between times t2 and t5. In other words, when the electric circular saw 200 according to the second embodiment of the present invention performs drive control, the period during which torque is generated is longer than the period in which torque is generated in the conventional power tool, thereby effectively suppressing torque ripple in the motor 204.

As stated above, the electric circular saw 200 as an example of the power tool according to the second embodiment of the present invention changes the number of conducting windings from three to two on the basis of the DC pulsating voltage and the induced voltage generated in the three-phase windings. In this way, the electric circular saw 200 can modify the combination of induced voltage generated in the conducting windings applied across the second positive line 52A and the second negative line 52B. Therefore, the electric circular saw 200 can lengthen the period of time during which the DC pulsating voltage is higher than the combination of induced voltage and current flows through the motor 4, i.e., the period during which torque is generated, thereby suppressing torque ripple. Further, since the electric circular saw 200 having this configuration changes the combination of induced voltage by modifying the number of conducting windings, the electric circular saw 200 can reduce power consumption and suppress demagnetization of permanent magnets in the rotor better than a structure that changes induced voltage by performing field-weakening control or the like to supply electric current for weakening the magnetic field.

Further, since the electric circular saw 200 sets the number of conducting windings to two when the DC pulsating voltage is less than the conduction switching threshold value, the electric circular saw 200 can reduce the combination of induced voltage generated in the conducting windings from that generated in three conducting windings. Therefore, current can be supplied to the motor 204 even when the DC pulsating voltage is lower than the combination of induced voltage in three conducting windings, thereby lengthening the period during which current flows through the motor 204. In this way, the electric circular saw 200 can suppress torque ripple. Further, since the conduction switching threshold value in the electric circular saw 200 is higher than the combination of induced voltages when there are three conducting windings, the electric circular saw 200 can reliably change the number of conducting windings from three to two before the DC pulsating voltage drops below the combination of induced voltages in two conducting windings, thereby reliably suppressing torque ripple.

From another perspective, since the electric circular saw 200 modifies the maximum series number of conducting windings connected in series between the second positive line 52A and the second negative line 52B on the basis of the DC pulsating voltage and the induced voltage, the electric circular saw 200 can change the combined voltage of induced voltage produced in the conducting windings, i.e., the combined voltage that is applied across the second positive line 52A and the second negative line 52B. Accordingly, the electric circular saw 200 can lengthen the period during which the DC pulsating voltage is higher than the combination of induced voltage and current flows through the motor 204, i.e., the period during which torque is produced, thereby suppressing torque ripple.

Further, since the electric circular saw 200 sets the maximum series number to 1 (one) (no series connection) when the DC pulsating voltage is less than the conduction switching threshold value, the electric circular saw 200 can reduce the combination of induced voltage generated in the conducting windings from that produced when the maximum series number is 2 (two). Accordingly, the electric circular saw 200 can supply current to the motor 204 even when the DC pulsating voltage is lower than the combination of induced voltage in conducting windings when the maximum series number is 2, thereby lengthening the period during which current flows through the motor 204. In this way, the electric circular saw 200 can suppress torque ripple.

The electric circular saw 200 also sets the number of conducting windings to 3 (three) and the maximum series number to 2 (two) using the 180° conduction method, and sets the number of conducting windings to 2 (two) and the maximum series number to 1 (one) using the 120° conduction method. In this way, the electric circular saw 200 can modify the number of conducting windings and the maximum series number simply by changing the conduction method. Accordingly, the electric circular saw 200 can eliminate the need for circuits or the like to modify these numbers, thereby simplifying the circuit structure and reducing manufacturing costs.

Note that while the invention is applied to an electric circular saw in the present embodiments, the present invention is not limited to these embodiments and various modifications and improvements may be made therein without departing from the spirit of the invention, the scope of which is defined by the attached claims. For example, the present invention may be applied to a power tool other than an electric circular saw that is provided with a brushless motor. The present invention is particularly suited to power tools such as disk grinders that operate while driving the brushless motor for a long period of time.

Further, while the controllers 54F and 254F in the embodiments are configured to calculate the induced voltage on the basis of the rotational speed of the rotor 42, the controller may be instead provided with induced voltage detecting means that detects the induced voltage itself.

Further, while three windings (the U-phase winding 41U, V-phase winding 41V, and W-phase winding 41W or the UV-phase winding 241A, VW-phase winding 241B and WU-phase winding 241C) are used in the first and second embodiments, a separate winding may be connected in series or parallel to each of these windings and switching between a series connection and a parallel connection may be performed on the basis of the DC pulsating voltage. Even in this case, the inductance can be modified in the conducting windings, thereby achieving the same effects as described in the first and second embodiments.

In the first embodiment, the timing for switching between the first conduction control and the second conduction control is based on the magnitude of the DC pulsating voltage (conduction switching threshold value). However, the switching timing may be based on the electrical angle of AC voltage from the commercial AC power supply P or based on time elapsed from the zero-crossing point of the AC voltage, for example, provided that the number of conducting windings or the maximum series number can be modified before the DC pulsating voltage falls below the combination of induced voltage in the conducting windings during the first conduction control.

REFERENCE SIGNS LIST 1, 200: electric circular saw, 2: housing, 3: base, 4, 204: motor, 4A: neutral point, 5: control board unit, 8: saw blade, 41: stator, 41U: U-phase winding, 41V: V-phase winding, 41W: W-phase winding, 42: rotor, 42A, 42B: permanent magnet, 51: voltage conversion circuit, 51E: first capacitor, 51F: second capacitor, 51G: reverse current prevention diode, 52: inverter circuit, 52A: second positive line, 52B: second negative line, 53: bridge circuit, 54: control circuit section, 54A: current detecting circuit, 54B: bus voltage detecting circuit, 54C: gate driving circuit, 54D: rotated position detecting circuit, 54E: control signal outputting circuit, 54F, 254F: controller, 241A: UV-phase winding, 241B: VW-phase winding, 241C: WU-phase winding, P: commercial AC power supply

The invention claimed is:

1. A power tool comprising:
a brushless motor comprising:
a stator including a plurality of windings; and
a rotor rotatable relative to the stator;
a voltage conversion circuit configured to convert an AC voltage supplied from an AC power supply into a varying DC voltage;
a voltage detector configured to detect the varying DC voltage;
an output line for applying the varying DC voltage to the plurality of windings; and
a controller configured to perform:
sequentially switching at least one winding to be applied with the varying DC voltage among the plurality of windings to rotate the rotor, and
changing number of conducting windings on the basis of the varying DC voltage, the number of conducting windings being number of the at least one winding to be applied with the varying DC voltage.

2. The power tool according to claim 1, wherein the varying DC voltage repeats rising and falling,
wherein, within a period of time during which the varying DC voltage falls, the controller performs decreasing, as the changing, the number of conducting windings, and
wherein, within a period of time during which the varying DC voltage rises, the controller performs increasing, as the changing, the number of conducting windings.

3. The power tool according to claim 1, wherein, when the varying DC voltage is higher than or equal to a voltage threshold value, the controller performs setting, as the changing, the number of conducting windings to a first conduction number,
wherein, when the varying DC voltage is lower than the voltage threshold value, the controller performs setting, as the changing, the number of conducting windings to a second conduction number, the second conduction number being smaller than the first conduction number, and
wherein the voltage threshold value is lower than a maximum value of the varying DC voltage and is higher than a combined voltage of induced voltages generated in the first conduction number windings applied with the varying DC voltage.

4. The power tool according to claim 3, wherein the plurality of windings constitutes star-connected three-phase windings having a neutral point, the power tool further comprising a bridge circuit capable of connecting the output line to the neutral point,
wherein the setting the number of conducting windings to the second conduction number is performed by applying the varying DC voltage to the star-connected three-phase windings via the bridge circuit.

5. The power tool according to claim 3, wherein the plurality of windings constitutes delta-connected three-phase windings,
wherein the setting the number of conducting windings to the first conduction number is performed by using a 180° conduction method, and
wherein the setting the number of conducting windings to the second conduction number is performed by using a 120° conduction method.

6. The power tool according to claim 1, further comprising a rotational speed detector configured to detect rotational speed of the rotor,
wherein the controller is configured to further perform calculating, on the basis of the rotational speed of the rotor, induced voltages generated in the plurality of windings by rotation of the rotor.

7. A power tool comprising:
a brushless motor comprising:
a stator including a plurality of windings; and
a rotor rotatable relative to the stator;
a voltage conversion circuit configured to convert an AC voltage supplied from an AC power supply into a varying DC voltage;
a voltage detector configured to detect the varying DC voltage;
an output line for applying the varying DC voltage to the plurality of windings, the output line comprising a positive line and a negative line; and
a controller configured to perform:
sequentially switching at least one winding to be connected between the positive line and the negative line and to be applied with the varying DC voltage among the plurality of windings to rotate the rotor, and
changing a maximum series number on the basis of the varying DC voltage, the maximum series number being a maximum number of the at least one winding to be connected in series between the positive line and the negative line.

8. The power tool according to claim 7, wherein the varying DC voltage repeats rising and falling,
wherein, within a period of time during which the varying DC voltage falls, the controller performs decreasing, as the changing, the maximum series number, and wherein, within a period of time during which the varying DC voltage rises, the controller performs increasing, as the changing, the maximum series number.

9. The power tool according to claim 7, wherein, when the varying DC voltage is higher than or equal to a voltage threshold value, the controller performs setting, as the changing, the maximum series number to a first series number, wherein, when the varying DC voltage is lower than the voltage threshold value, the controller performs setting, as the changing, the maximum series number to a second series number, the second series number being smaller than the first series number, and wherein the voltage threshold value is lower than a maximum value of the varying DC voltage and is higher than a combined voltage of induced voltages generated in the first series number windings connected in series between the positive line and the negative line.

10. The power tool according to claim 9, wherein the plurality of windings constitutes star-connected three-phase windings having a neutral point, the power tool further comprising a bridge circuit capable of connecting the neutral point selectively to one of the positive line and the negative line, wherein the setting the maximum series number to the second series number is performed by applying the varying DC voltage to the star-connected three-phase windings via the bridge circuit.

11. The power tool according to claim 9, wherein the plurality of windings constitutes delta-connected three-phase windings, wherein the setting the maximum series number to the first series number is performed by using a 180° conduction method, and wherein the setting the maximum series number to the second series number is performed by using a 120° conduction method.

* * * * *